US006899375B2

(12) United States Patent
Sankrithi et al.

(10) Patent No.: US 6,899,375 B2
(45) Date of Patent: May 31, 2005

(54) RECREATIONAL VEHICLE WITH INTEGRATED PICKUP BED

(75) Inventors: Mithra M. K. V. Sankrithi, Lake Forest Park, WA (US); Śiva U. M. Sankrithi, Lake Forest Park, WA (US)

(73) Assignee: RSV Invention Enterprises, Lake Forest Park, WA (US)

( * ) Notice: Subject to any disclaimer, the term of this patent is extended or adjusted under 35 U.S.C. 154(b) by 0 days.

(21) Appl. No.: 10/662,773

(22) Filed: Sep. 15, 2003

(65) Prior Publication Data

US 2005/0057071 A1    Mar. 17, 2005

(51) Int. Cl.[7] .................................................. B60P 3/36
(52) U.S. Cl. ..................... 296/156; 296/158; 296/164; 296/61; 296/168
(58) Field of Search ................ 296/157, 158, 296/164, 24.43, 24.3, 182.1, 183.1, 57.1, 296/61, 156, 162, 168

(56) References Cited

U.S. PATENT DOCUMENTS

| | | | | |
|---|---|---|---|---|
| 3,563,596 A | * | 2/1971 | Davis | 296/158 |
| 3,784,248 A | * | 1/1974 | Neuman | 296/157 |
| 3,961,716 A | * | 6/1976 | Renaud | 296/158 |
| 4,127,299 A | * | 11/1978 | Blair | 296/168 |
| 5,154,478 A | * | 10/1992 | Erickson et al. | 296/39.2 |
| 5,505,514 A | * | 4/1996 | Green | 296/157 |
| 5,967,583 A | * | 10/1999 | Wishart | 296/156 |
| 6,135,532 A | * | 10/2000 | Martin | 296/61 |
| 6,692,062 B1 | * | 2/2004 | Woodard et al. | 296/164 |
| 2003/0111866 A1 | * | 6/2003 | Crean | 296/164 |

* cited by examiner

Primary Examiner—Jason Morrow

(57) ABSTRACT

This invention relates to Recreational Vehicles (RVs) such as motorhomes, travel trailers, and fifth-wheel type camper trailers. The invention provides for a Recreational Vehicle configured with an integrated open-top cargo bed or pickup bed for carrying a wide variety of external loads, located in a portion of the aft end of the RV.

58 Claims, 36 Drawing Sheets

PRIOR ART

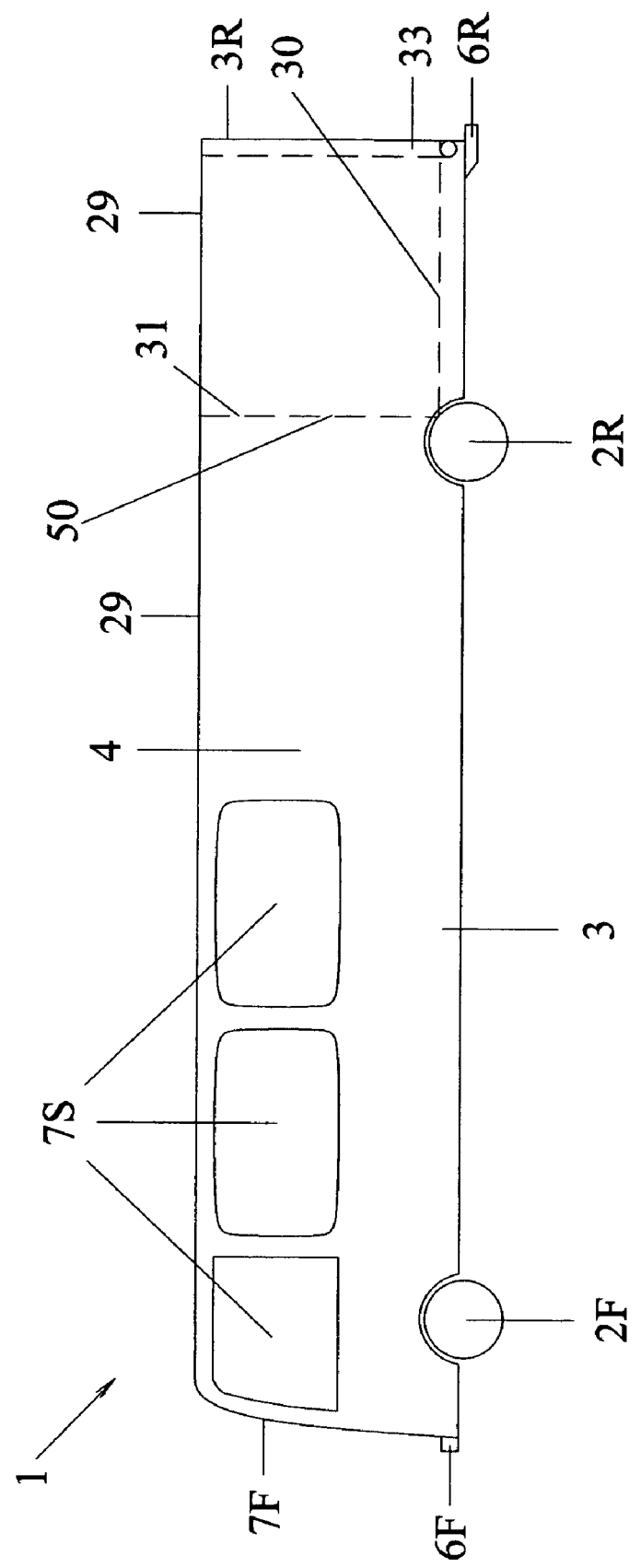

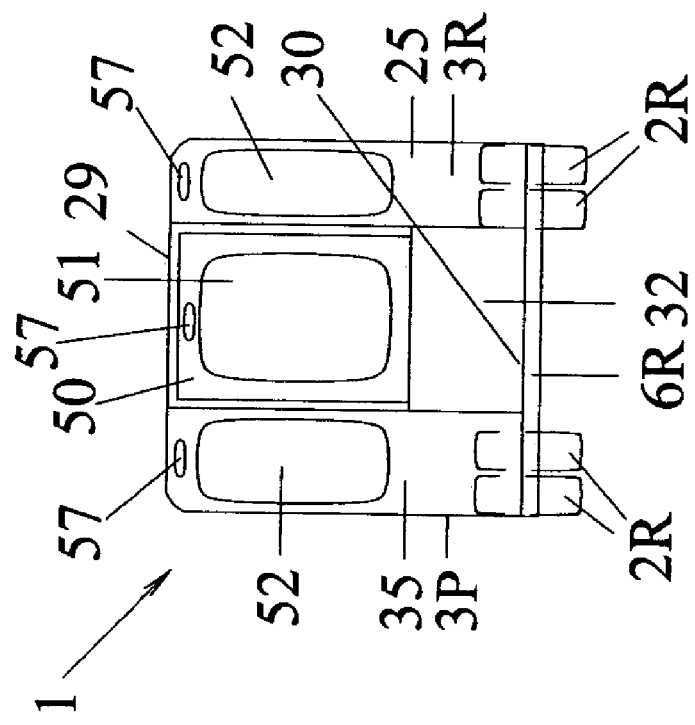

RECREATIONAL VEHICLE WITH INTEGRATED PICKUP BED

BACKGROUND OF THE INVENTION

This invention relates to Recreational Vehicles (RVs) such as motorhomes, travel trailers, and fifth-wheel type camper trailers. These Recreational Vehicles are motor-driven or towed wheeled vehicles intended to traverse roadways, while providing enclosed volumes suitable for use(s) by camping occupants such one or more of: cooking, eating, sleeping, entertainment, bathroom functions and vehicle internal storage. Many state-of-the-art RVs provide enclosed volumes for internal storage, and some provide for limited roof-top external storage. However, roof-top storage is hard to access especially with heavy loads, and even if it can be accessed increases the risk of the vehicle suffering a rollover accident. Thus many RV owners and users are forced to carry desired external loads such as bicycles, motorcycles, a snowmobile, a water-scooter or canoe, or a small automobile on a towed trailer behind the RV. The use of a trailer is a significant inconvenience and adds substantially to the difficulty of driving the RV and of executing maneuvers such as backing-up.

BRIEF SUMMARY OF THE INVENTION

It is an object of the present invention to enable owners/users of a Recreational Vehicle (RV) to carry external loads, without use of rooftop carriage and its associated difficulty of access and increased rollover risk.

It is an object of the present invention to enable owners/users of a Recreational Vehicle (RV) to carry external loads, without use of a towed trailer and the associated difficulty of driving and maneuvering the RV+trailer combination.

It is an object of the present invention to provide a new class of Recreational Vehicle (RV) with an integrated cargo or pickup bed suitable for carrying external loads, with a synergistic configuration which efficiently and effectively divides usable space for desired internal uses and desired external loads.

BRIEF DESCRIPTION OF THE DRAWINGS

FIGS. 3C and 3D show side views of an alternate embodiment which is similar to the embodiment of FIG. 2, with a tall tailgate which also serves as a loading ramp when open.

FIG. 4 shows a rear view of the embodiment of FIG. 2.

DETAILED DESCRIPTION

Figure 1:
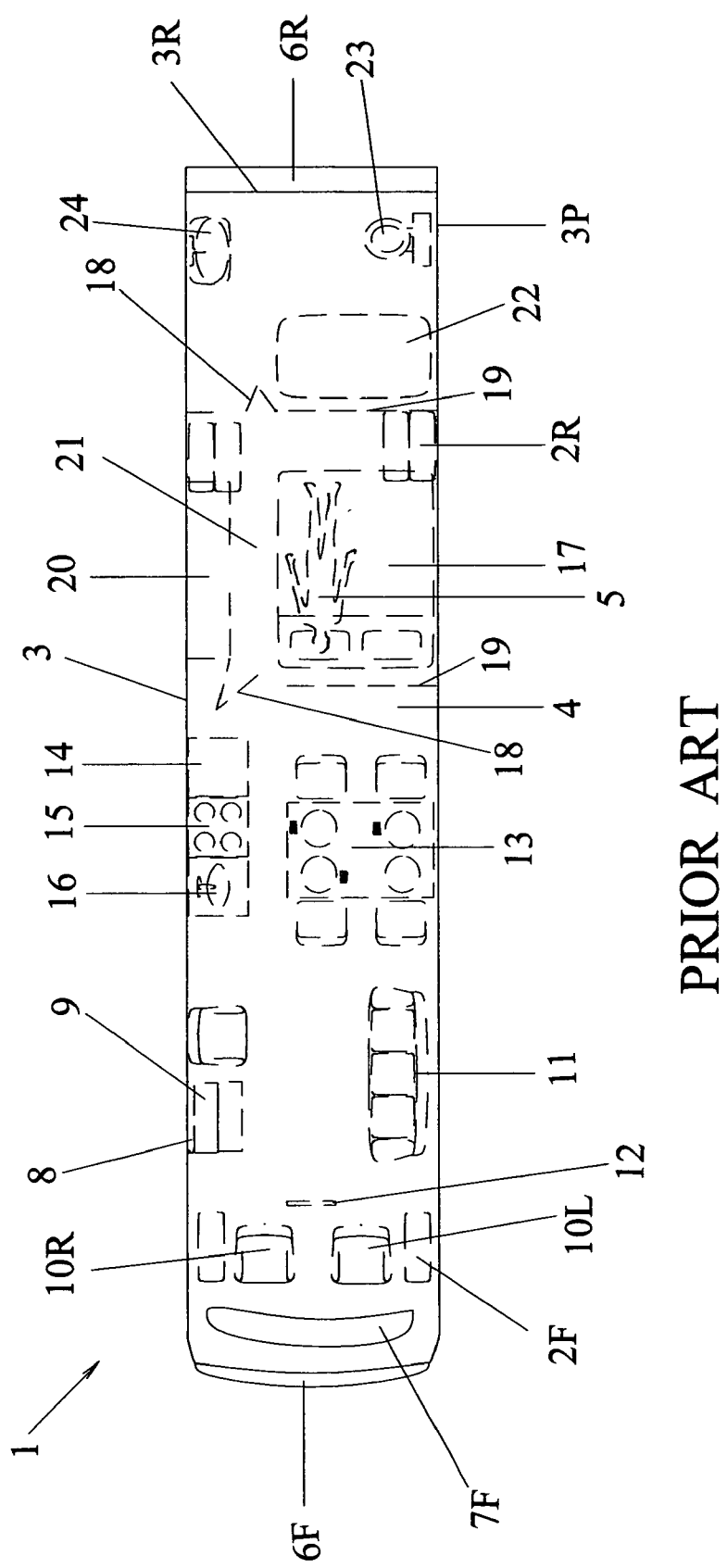
FIG. 1 shows a plan view of a representative prior art Recreational Vehicle, in this illustration a Class A motorhome.

FIG. 1 shows a plan view of a representative prior art Recreational Vehicle (RV) 1, in this illustration a Class A motorhome. The RV is supported on a land surface such as a road, on front running gear means 2F including tires, and rear running gear means 2R including tires, for permitting said Recreational Vehicle to move and maneuver upon a road surface. The Recreational Vehicle 1 comprises a vehicle body 3 supported by said front and rear running gear means 2F and 2R, which vehicle body 3 comprises a substantially enclosable compartment 4 suitable for accommodating at least one camping occupant. The rear end of the body is designated 3R, and the outer perimeter of the body is designated 3P. The RV is fitted with a front bumper 6F and a rear bumper 6R and a front windshield 7F. The RV is also fitted with door means 8 for said camping occupant to enter said compartment 4 from outside said Recreational Vehicle, and optional entry stair(s) 9 if the height of the floor level of said compartment 4 above the outside road surface warrants it. The compartment 4 is enclosable through closure of the door means 8. The compartment 4 includes a front left seat 10L which would be a driver's seat in left-hand-drive jurisdictions such as the United States, but could be a passenger's seat in right-hand-drive jurisdictions such as the United Kingdom. The compartment 4 also includes a front right seat 10R which would be a passenger's seat in left-hand-drive jurisdictions such as the United States, but could be a driver's seat in right-hand-drive jurisdictions such as the United Kingdom. The compartment also includes seating means 11 such as a sofa or sofa-bed suitable for use by said camping occupant for sitting; entertainment means 12 such as an entertainment screen for viewing television or video material; means for dining 13 such as a dining table suitable for use by said camping occupant for dining; means for refrigeration 14 such as a refrigerator suitable for use by said camping occupant for storing and preserving perishable foodstuffs; means for cooking 15 such as a cooking range suitable for use by said camping occupant for cooking; a kitchen sink 16; a bed 17 suitable for use by said camping occupant 5 for sleeping; one or more doors 18 connected to partition means 19 for separating areas within said compartment; closet means 20 for storing articles such as clothing; passageway means 21 such as an aisle for permitting an occupant to traverse to different locations within said compartment; and bathroom facility elements typically comprising means for bathing 22 such as the illustrated bathtub, toilet means 23 suitable for use by said camping occupant for at least one of urination and defecation, and a bathroom sink 24.

Figure 2:
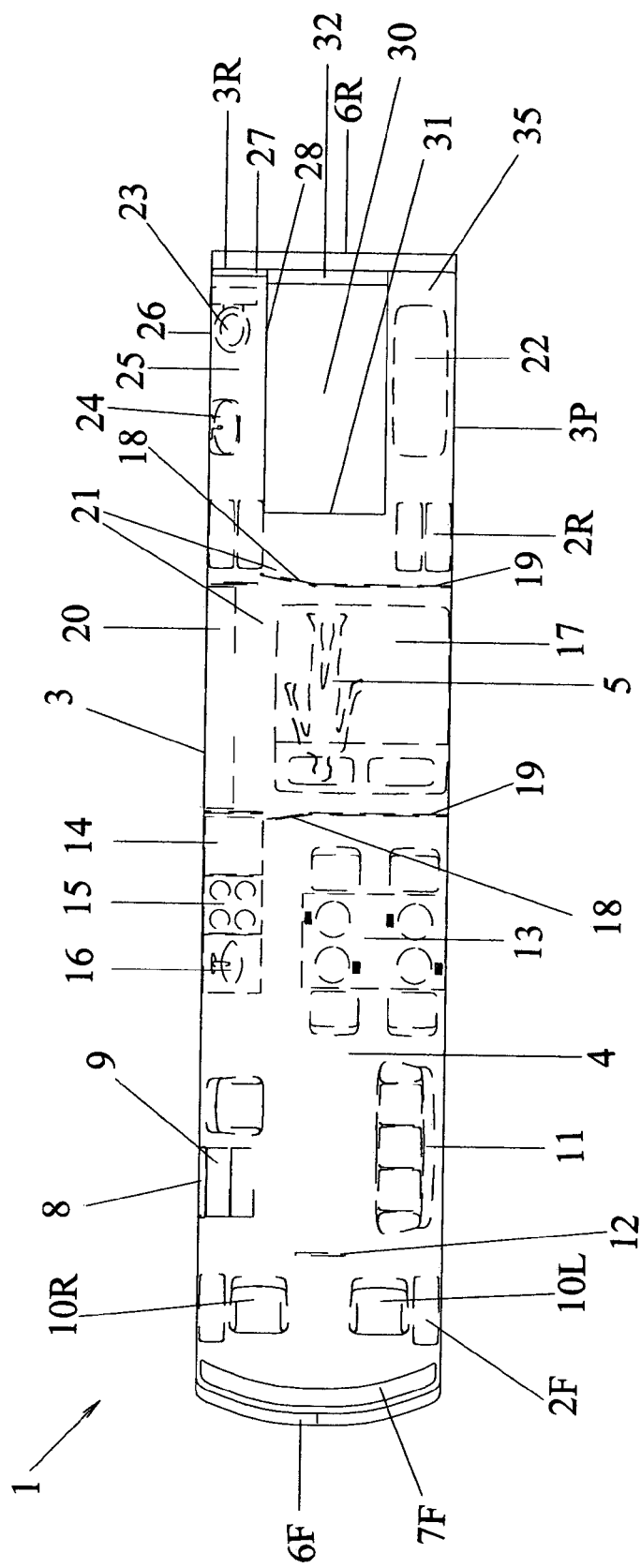
FIG. 2 shows a plan view of an embodiment of the present invention, reconfigured relative to the FIG. 1 prior art motorhome to now include an integrated pickup bed or cargo bed located at the aft region of the motorhome, which cargo bed is accessible from the rear of the motorhome.

FIG. 2 shows a plan view of an embodiment of the present invention, reconfigured from the FIG. 1 prior art motorhome to now include an integrated pickup bed or cargo bed 30 located at the aft region of the motorhome, which cargo bed is accessible from the rear of the motorhome. Thus FIG. 2 shows a plan view of a representative Recreational Vehicle (RV) 1, in this illustration a Class A motorhome, which is supported on a land surface such as a road, on front running gear means 2F including tires, and rear running gear means 2R including tires, for permitting said Recreational Vehicle to move and maneuver upon a road surface. The running gear means will preferably comprise at least four tires, with six in the illustrated embodiment. The Recreational Vehicle 1 comprises a vehicle body 3 supported by said front and rear running gear means 2F and 2R, which vehicle body 3 comprises a substantially enclosable compartment 4 suitable for accommodating at least one camping occupant. The rear end of the body is designated 3R, and the outer perimeter of the body is designated 3P. The compartment 4 includes an extension 25 extending rearwardly substantially to the rear end of the body 3R, said extension having a first side wall 26, a rear wall 27, and a second side wall 28, said second side wall 28 spaced inwardly of an outer perimeter of the body 3P, with beneficial use means for permitting said extension 25 to be used by said camping occupant for at least one beneficial camping-related use, with the beneficial use means illustrated comprising toilet means 23 suitable for use by said camping occupant for at least one of urination and defecation, which toilet means is situated at least in part in said extension 25. The extension 25 also includes a bathroom sink 24 in the illustrated embodiment, providing sink means for permitting hand-washing which is also situated at least in part in said extension 25. In the illustrated embodiment, another beneficial means for permitting the extension 25 to be used by the camping occupant comprises the extension 25 being at least 17 inches wide and at least 70 inches tall so as to be able to accommodate a normal-sized camping occupant in a standing posture. The interior floor level in the extension 25 may optionally be raised relative to the interior floor level in the main (forward) part of the compartment 4. The open top cargo bed 30 is bounded at a forward edge by a rear wall 31 of said compartment 4 and at one side edge by said second side wall 28, and at the rear by a tailgate 32 which serves as openable tailgate means 32 at the aft end of the cargo bed 30 for enabling cargo loads to be loaded into and unloaded from said cargo bed 30. The illustrated cargo bed 30 is also at least 30 inches wide and at least 60 inches long, to enable carriage of desired large external loads. The Recreational Vehicle of FIG. 2 further comprises a second extension 35 included in said compartment 4 and extending rearwardly substantially to a rear end of said body, which second extension 35 is situated on the opposite side of said cargo bed 30 as said extension 25. The second extension 35 is illustrated with beneficial use means comprising means for bathing 22 suitable for use by said camping occupant for bathing (such as the illustrated bathtub which may also include a shower), which means for bathing is situated at least in part in said (second) extension 35. The interior floor level in the second extension 35 may also be optionally raised relative to the interior floor level in the main (forward) part of the compartment 4. While the illustrated beneficial use means comprises means for bathing suitable for use by said camping occupant for bathing, which means for bathing is situated at least in part in said second extension 35, it will be evident that with left-to-right switching variations, it will be possible to provide means for bathing suitable for use by said camping occupant for bathing which means for bathing is situated at least in part in said extension 25 rather than in said second extension 35. In the illustrated embodiment passageway means 21 connect the extension 25 with the second extension 35, so that together they serve as a complete bathroom; and this passageway means 21 is accessed via (door) means 18 for permitting said camping occupant to enter said extension from more forward locations in said compartment 4.

The RV of FIG. 2 is also fitted with a front bumper 6F and a rear bumper 6R and a front windshield 7F. The RV is also fitted with door means 8 for said camping occupant to enter said compartment 4 from outside said Recreational Vehicle, and optional entry stair(s) 9 if the height of the floor level of said compartment 4 above the outside road surface warrants it. The compartment 4 is enclosable through closure of the door means 8. The compartment 4 includes a front left seat 10L which would be a driver's seat in left-hand-drive jurisdictions such as the United States, but could be a passenger's seat in right-hand-drive jurisdictions such as the United Kingdom. The compartment 4 also includes a front right seat 10R which would be a passenger's seat in lefthand-drive jurisdictions such as the United States, but could be a driver's seat in right-hand-drive jurisdictions such as the United Kingdom. Thus the vehicle body 3 includes means for accommodating a driver's seat such as the front left seat 10L and means for a driver for seeing outside said Recreational Vehicle such as the front windshield 7F. Additional optional means for a driver for seeing could include a rear window, external and/or internal rear-view mirrors, and/or a rear-view camera with a driver-viewable display. The compartment 4 also includes seating means 11 such as a sofa or sofa-bed suitable for use by said camping occupant for sitting; entertainment means 12 such as an entertainment screen for viewing television or video material; means for providing a dining table surface suitable for use by said camping occupant for dining such as a dining table 13; means for refrigeration 14 such as a refrigerator suitable for use by said camping occupant for storing and preserving perishable foodstuffs; means for cooking 15 such as a cooking range suitable for use by said camping occupant for cooking; a kitchen sink 16; a bed 17 suitable for use by said camping occupant 5 for sleeping; one or more doors 18 in partition means 19 for separating areas within said compartment; closet means 20 for storing articles such as clothing; and passageway means 21 such as an aisle for permitting an occupant to traverse to different locations within said compartment.

Figure 3A:
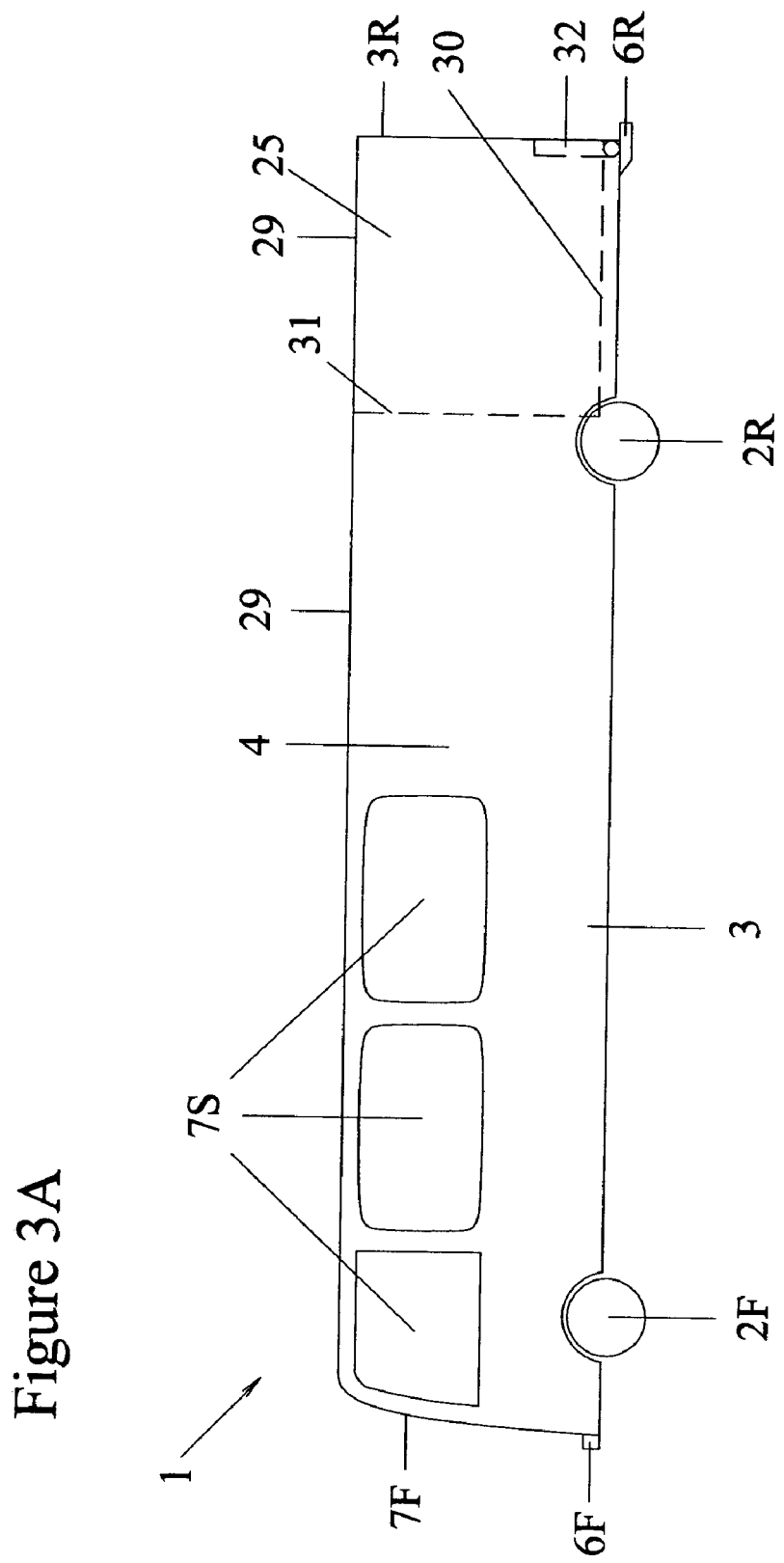
FIG. 3A shows a side view of the embodiment of FIG. 2 with the cargo bed enclosed by a tailgate.

FIG. 3A shows a side view of the embodiment of FIG. 2, showing a roof 29 extending over the compartment 4 and over the extension 25 included in said compartment. FIG. 3A also illustrates side windows 7S, which serve as window means for the camping occupant for seeing outside the Recreational Vehicle, while located within the compartment 4. The side windows 7S can also serve as contributory means for a driver for seeing outside said Recreational Vehicle. The embodiment illustrated in FIGS. 2 and 3A also illustrates in a Recreational Vehicle 1 comprising a body 3 and an interior compartment 4 suitable for accommodating at least one camping occupant 5, the improvement comprising: an extension 25 to said compartment extending rearwardly substantially to a rear end 3R of said body, said extension having a first side wall 26, a rear wall 27, and a second side wall 28, said second side wall spaced inwardly of an outer perimeter 3P of the body, adequate space means for said camping occupant to enter and use said extension; a roof 29 extending over said compartment and over said extension; and an open top cargo bed 30 bounded at a forward edge by a rear wall 31 of said compartment 4 and at one side edge by said second side wall 28.

The embodiment illustrated in FIGS. 2 and 3A further illustrates a Recreational Vehicle 1 comprising: running gear means (2F, 2R) for permitting said Recreational Vehicle to move and maneuver upon a road surface; a vehicle body 3 supported by said running gear means, which vehicle body comprises a substantially enclosable compartment 4, said compartment including two extensions 25 and 35 extending rearwardly substantially to a rear end of said body; a roof 29 extending over said compartment and over said two extensions included in said compartment; and an open top cargo bed 30 bounded at a forward edge by a rear wall 31 of said compartment 4 and on its two side edges by said two extensions 25 and 35.

Figure 3B:
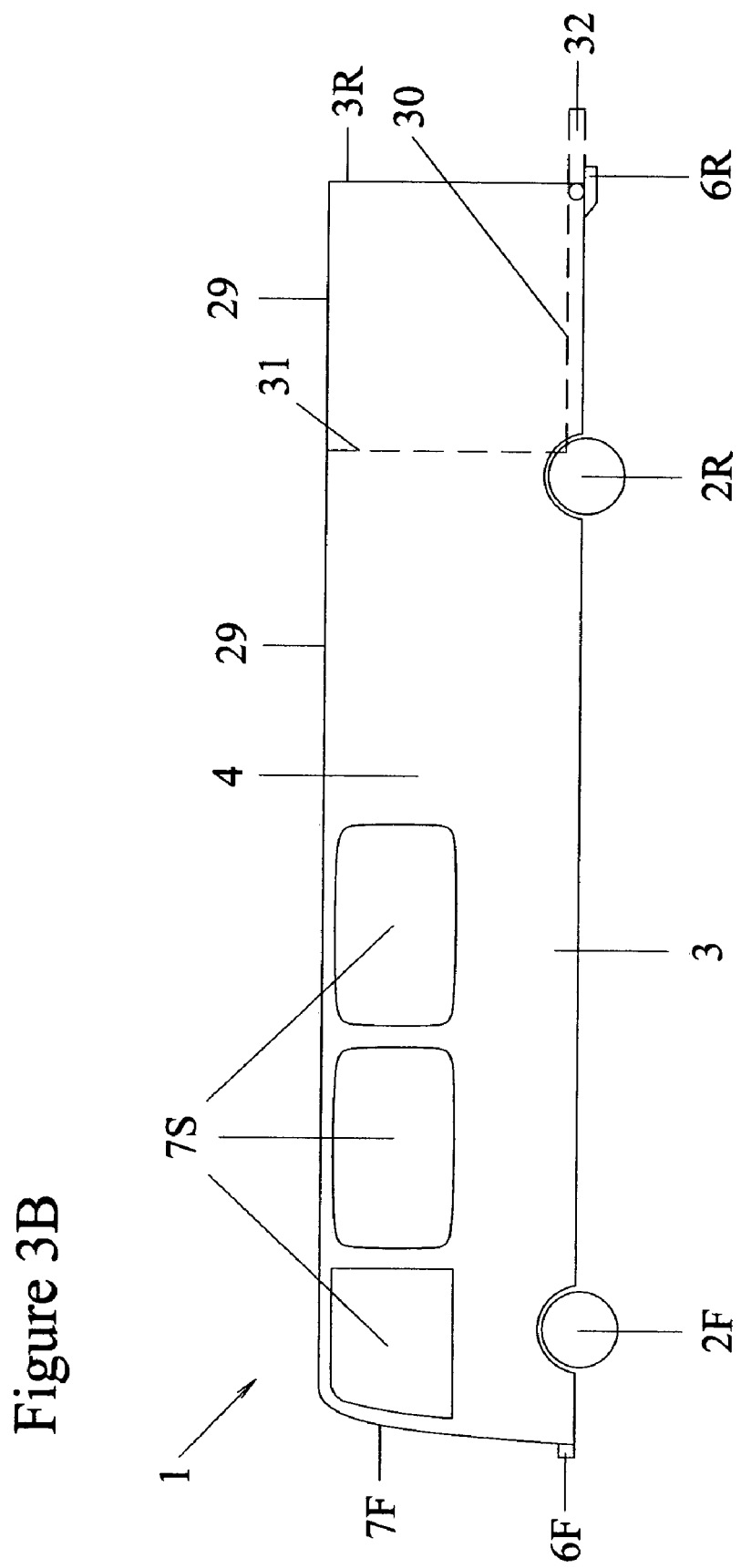
FIG. 3B shows the same embodiment with the tailgate open.
Figure 3D:
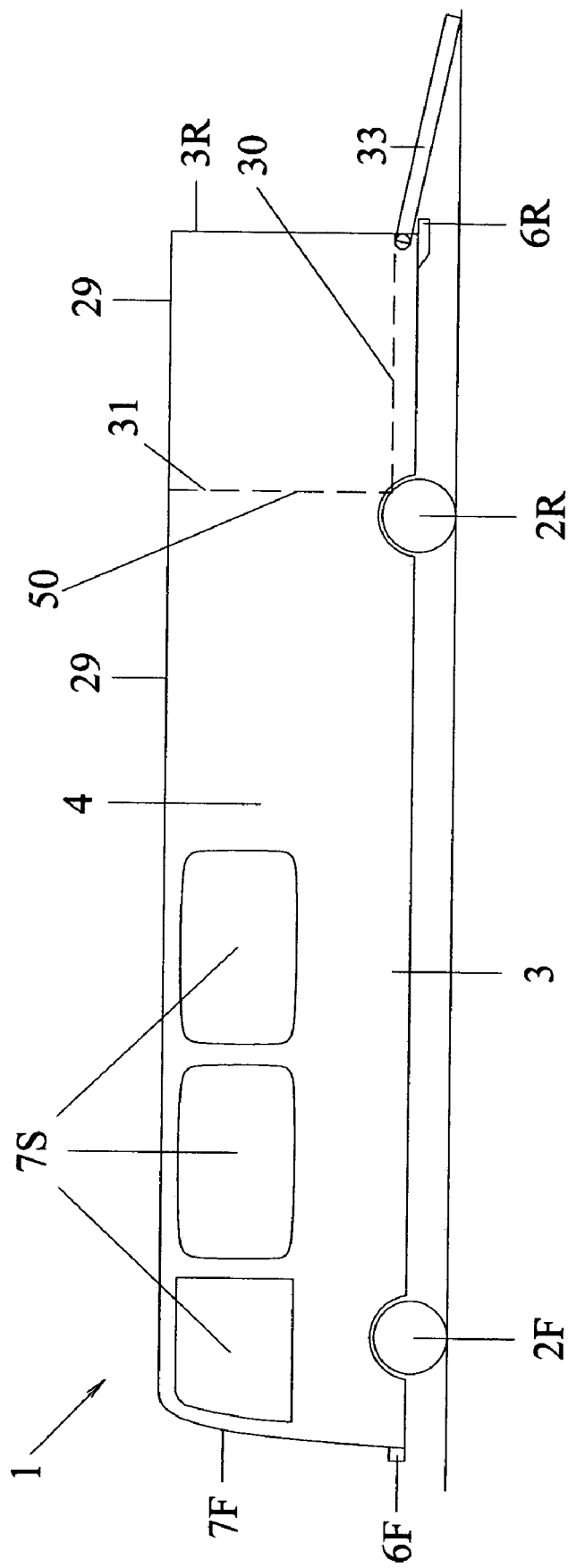

FIG. 3B shows the same embodiment as FIG. 3A, but with the tailgate 32 open or down rather than closed or up, to serve as openable tailgate means 32 at the aft end of the cargo bed 30 for enabling cargo loads to be loaded into and unloaded from said cargo bed. FIGS. 3C and 3D show an embodiment similar to that of FIGS. 3A and 3B, but with the tailgate 32 replaced by a tailgate ramp 33, shown closed or up in FIG. 3C and open or down in FIG. 3D. The tailgate ramp 33 serves as a beneficial tall tailgate when closed or up (FIG. 3C), and when open or down (FIG. 3D) serves as deployable ramp means at the aft end of said cargo bed 30, for facilitating the loading and unloading of cargo into and from said cargo bed. In the illustrated embodiment of FIG. 3C, an optional cargo bed access door 50 is also illustrated, which enables a camping occupant to move from the compartment 4 onto the cargo bed 30, wherein the cargo bed 30 is also of sufficient size and shape to accommodate a mattress (mattress not shown) for permitting the camping occupant to sleep thereon. This embodiment could also beneficially serve for the carriage of a horse or a cow or other animal in the cargo bed, with a relatively easy ramp for the animal to use for boarding and high walls on all sides to keep it safely constrained on the cargo bed while the vehicle is in motion.

Figure 3E:
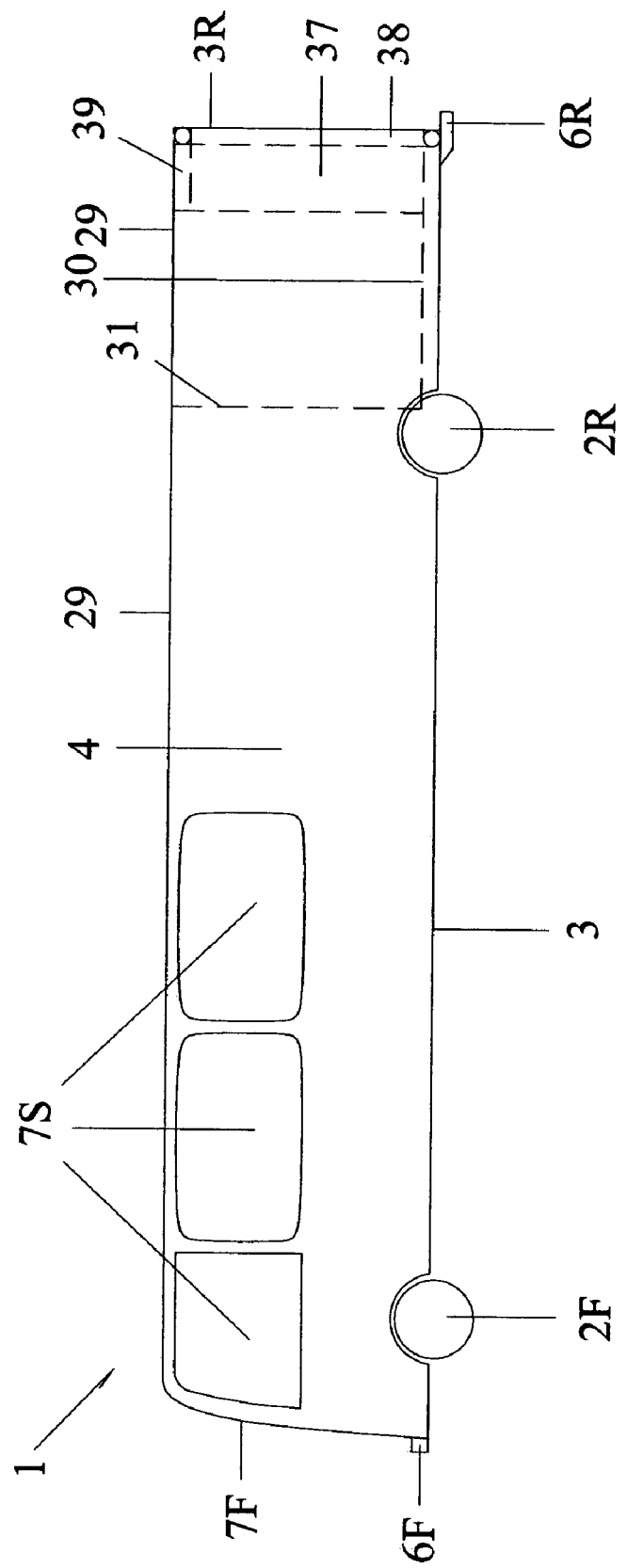
FIGS. 3E and 3F show side views of another alternate embodiment which is similar to the embodiment of FIG. 2, with a deployable cargo bed extension which serves to enclose the cargo bed when undeployed.

FIG. 3E shows a side view of another alternate embodiment which is similar to the embodiment of FIG. 3C, with a deployable cargo bed extension 37 hingedly connected to the vehicle, which serves to enclose the aft end of the cargo bed 30 when undeployed, as illustrated. The cargo bed extension 37 includes an extension floor 38 which is approximately vertically oriented when the cargo bed extension 37 is undeployed, as illustrated. The cargo bed extension 37 also includes an extension tailgate 39, hingedly connected to said extension floor 38 as illustrated.

Figure 3F:
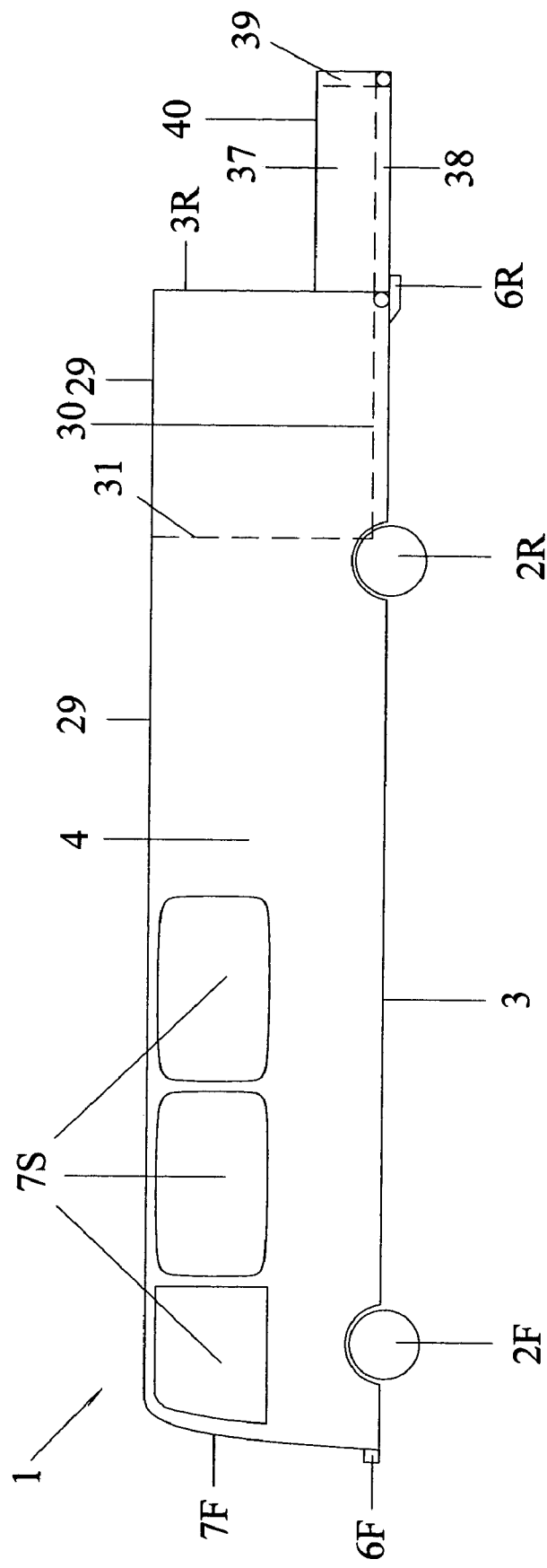

FIG. 3F shows the same embodiment as FIG. 3E, but with the deployable cargo bed extension 37 deployed. Optional extension sidewalls 40 are included as part of the cargo bay extension 37 in this view, and serve to provide lateral constraint for any cargo loads that may be carried on the extension floor 38. The extension tailgate 39 serves to provide an aft longitudinal constraint for any cargo loads that may be carried on the extension floor 38, and this extension tailgate 39 may be opened when desired to facilitate loading of cargo onto the extension floor. The embodiment of the invention shown in FIG. 3F can clearly carry longer or larger cargo loads through deployment of the extension, than could an embodiment not fitted with a cargo bed extension and having the same size cargo bed 30. Thus the embodiment shown in FIG. 3E and FIG. 3F illustrates a Recreational Vehicle 1 further comprising a deployable cargo bed extension 37 for extending the cargo bed 30, which deployable cargo bed extension 37 includes an extension surface which serves as a cargo bed extension floor 38 when said deployable cargo bed extension is deployed, and which extension surface serves as a tailgate surface for said cargo bed 30 when said deployable cargo bed extension is undeployed.

Figure 3G:
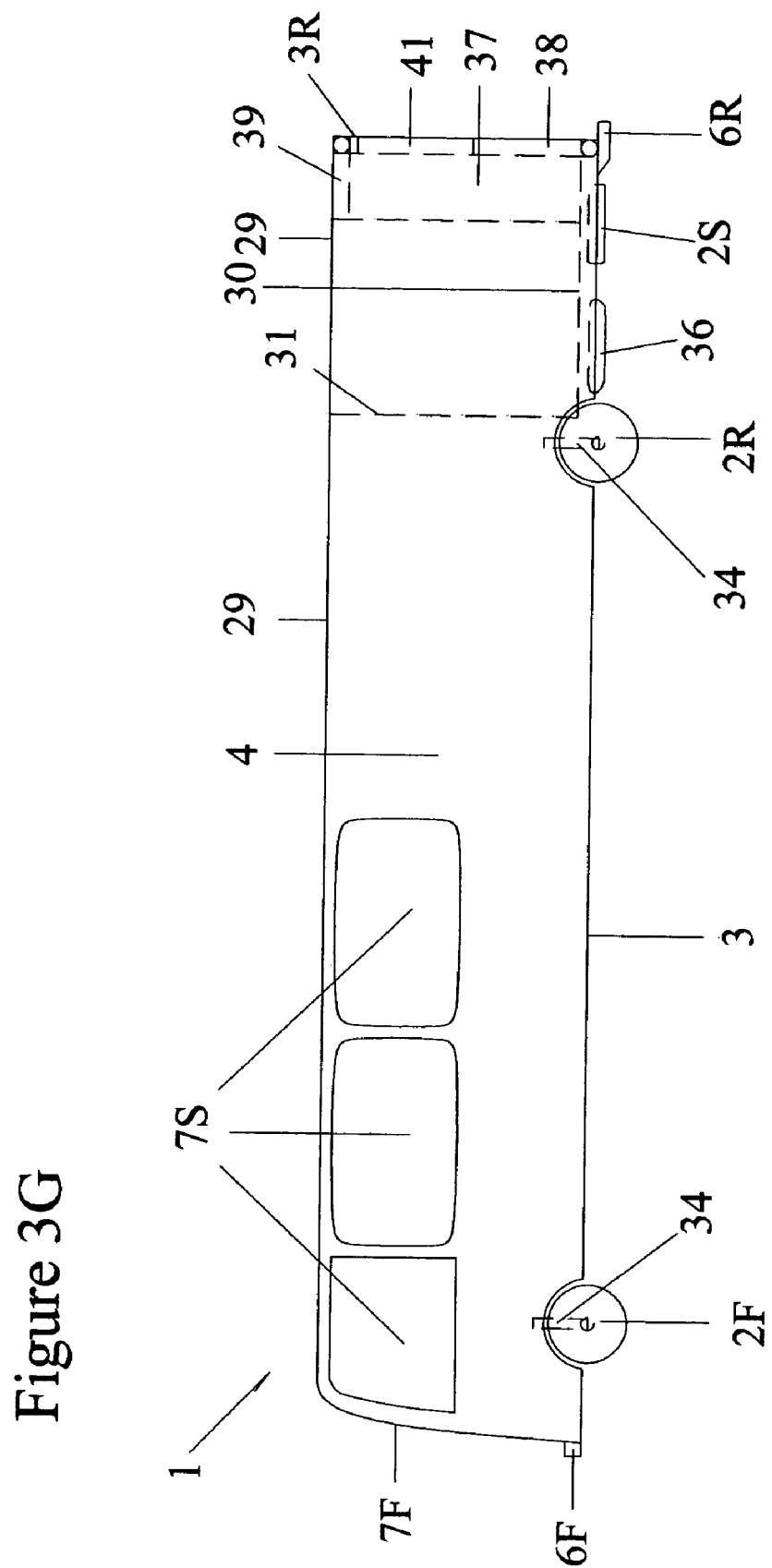
FIG. 3G shows a side view of a variant from that of FIG. 3E, fitted with a coverable window panel in the extension floor and an active suspension system.

FIG. 3G shows a side view of a variant from that of FIG. 3E, fitted with a coverable window panel 41 in the extension surface or extension floor 38, which could optionally be used in conjunction with another window in rear wall 31 to enable rear viewing for persons within the RV including the driver using a rear-view mirror. FIG. 3G also illustrates use of an active suspension system 34, which in addition to load support and shock absorbing functions can also provide optional load leveling for both static loads as may occur with a heavily laden cargo bed, and dynamic loads as may occur when executing turns and in order to minimize or prevent body leaning during such turns. The active suspension system may also allow the vehicle ground clearance to be changed by the driver, for example by raising the ground clearance as may be desired for driving over rough roads. FIG. 3G also illustrates a Recreational Vehicle 1 wherein said cargo bed 30 is located at least in part above a fuel tank 36, and wherein said cargo bed 30 is located at least in part above a spare tire housing 2S.

Figure 3H:
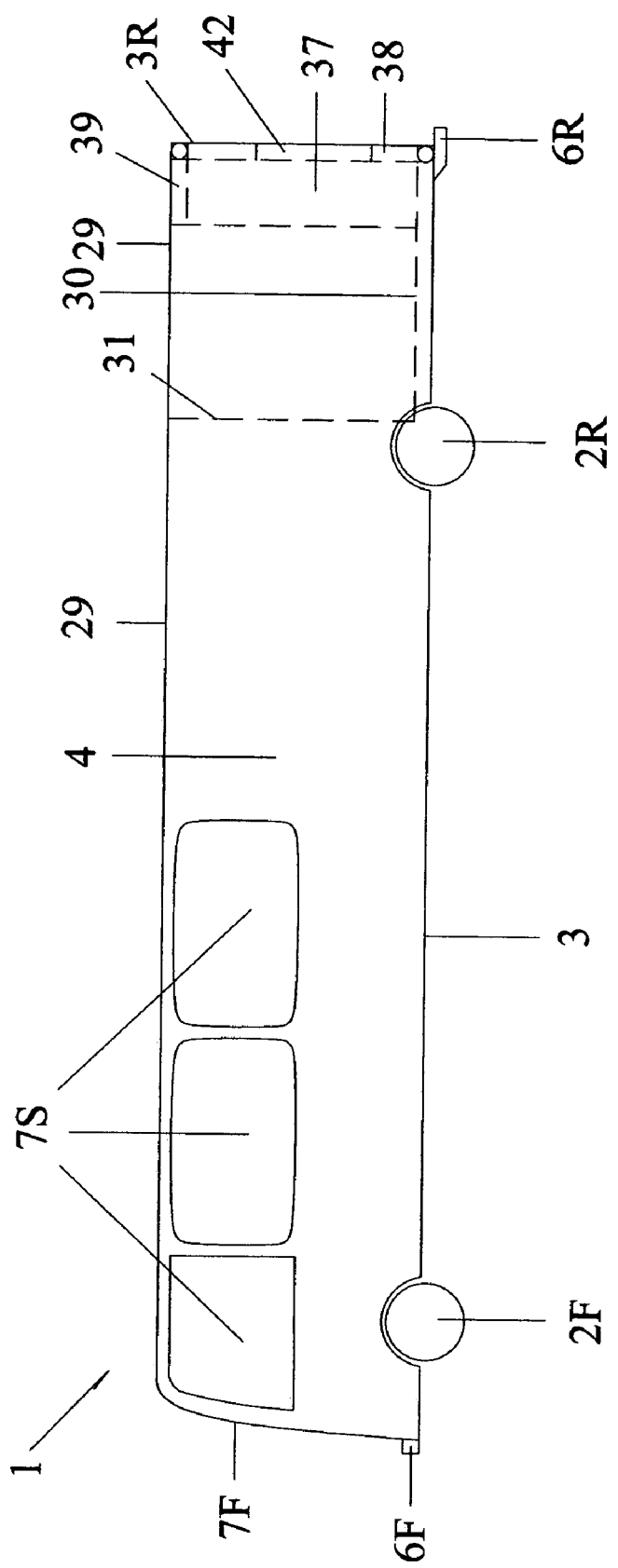
FIG. 3H shows a side view of a variant from that of FIG. 3E, fitted with an openable access panel in the extension floor.

FIG. 3H shows a side view of a variant from that of FIG. 3E, fitted with an openable access panel 42 in the extension surface or extension floor 38 to permit items to be loaded into the cargo bed 30 through the extension floor, even while the cargo bed extension 37 remains in its undeployed configuration. The openable access panel may be openable inward, outward, or be of a sliding open or bifold configuration.

Figure 3I:
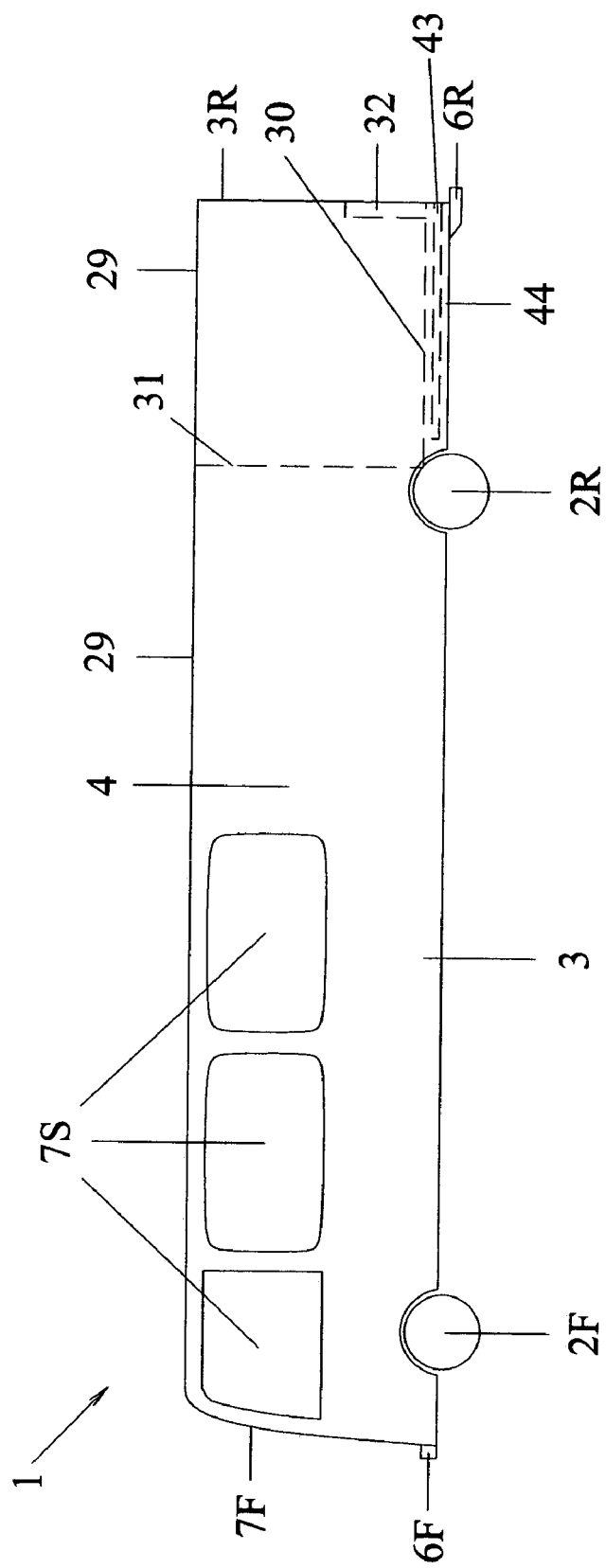
FIGS. 3I and 3J shows an embodiment similar to that of FIGS. 3C and 3D, but with a deployable ramp separate from the tailgate.
Figure 3J:
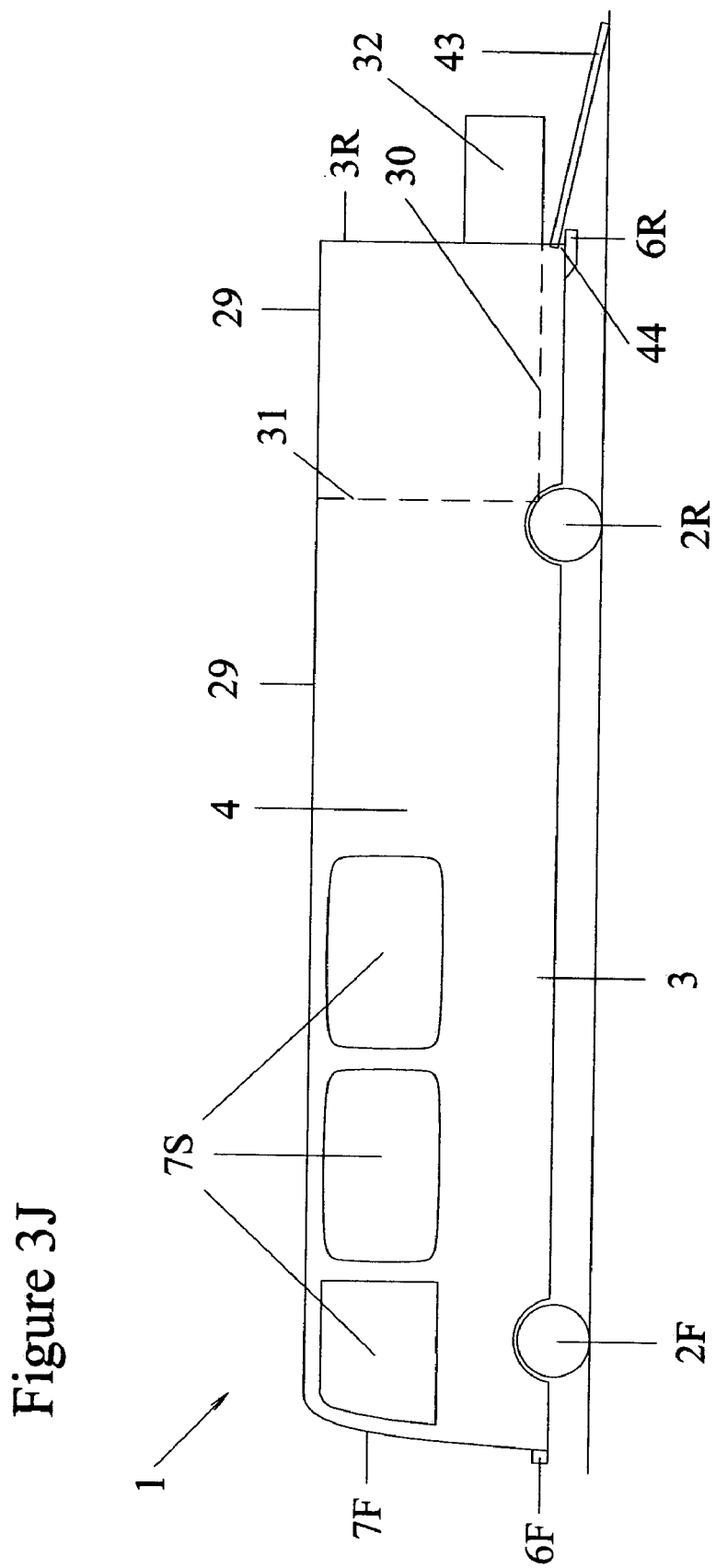

FIG. 3I shows an embodiment similar to that of FIG. 3C, but with a deployable ramp 43 separate from the tailgate 32, which tailgate in this embodiment has one (or optionally two) sideward opening panel(s). The deployable ramp is shown in its undeployed configuration, supported by ramp support structure and bearing means 44 for supporting the deployable ramp 43. FIG. 3J shows the same embodiment as FIG. 3I but with the deployable ramp 43 deployed to serve as deployable ramp means at the aft end of said cargo bed 30, for facilitating the loading and unloading of cargo into and from said cargo bed 30.

Figure 3K:
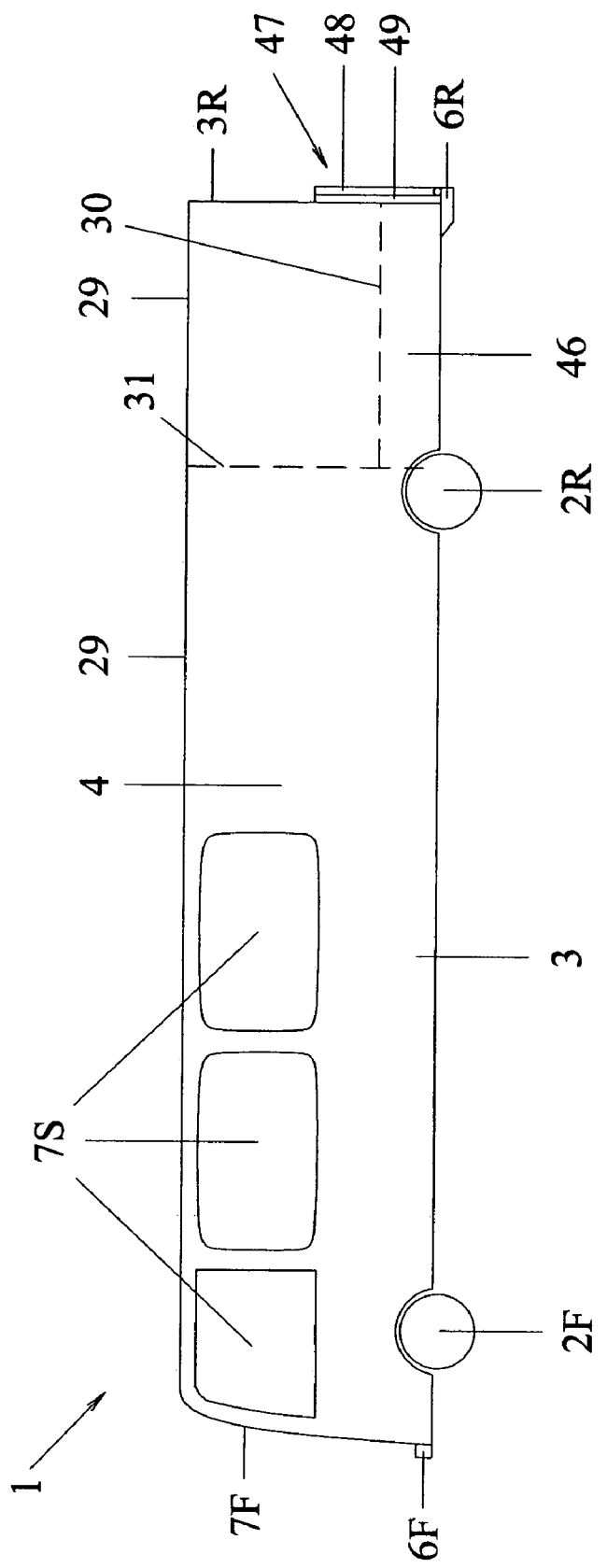
FIGS. 3K and 3L show an embodiment with a cargo bed above an aft engine location, and fitted with deployable cargo lift means.
Figure 3L:
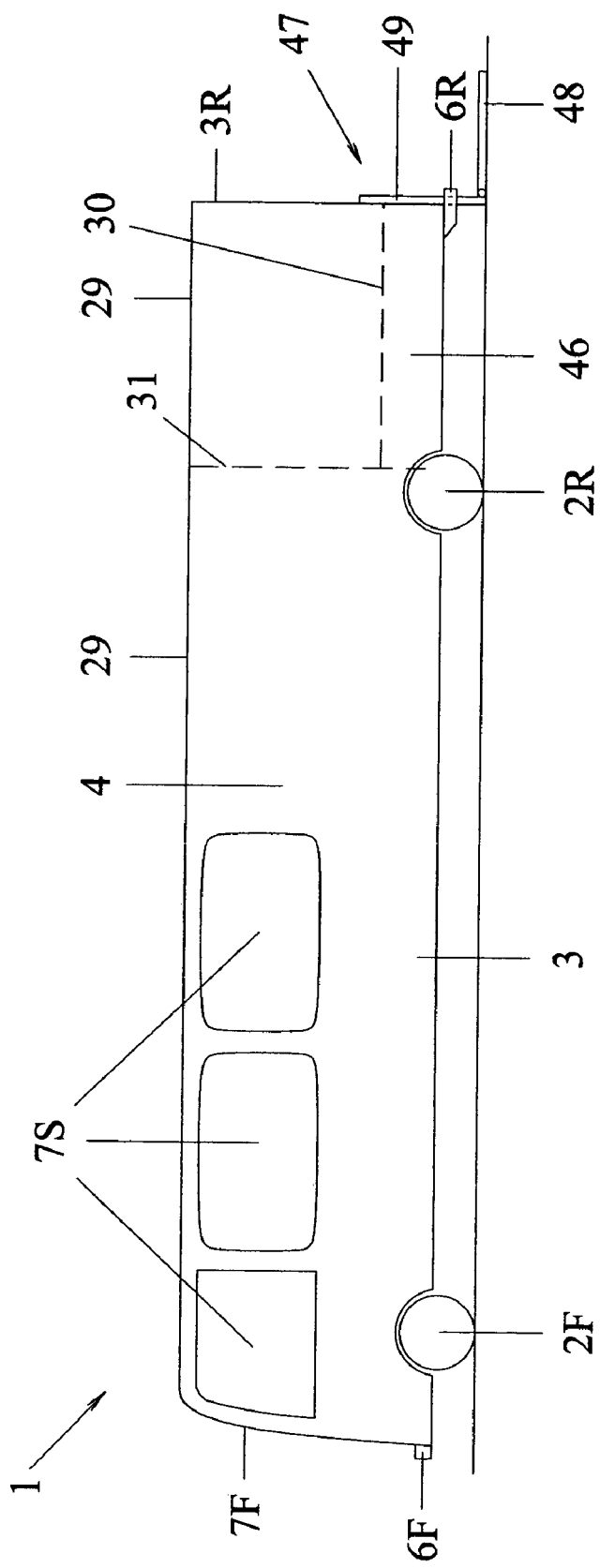

FIGS. 3K and 3L show an embodiment of a Recreational Vehicle 1 wherein the cargo bed 30 is located at least in part above an aft engine location 46, and fitted with cargo lift means 47. FIG. 3K shows the cargo lift means 47 in its undeployed configuration, with the cargo lift means 47 comprising a cargo lift platform 48 folded up and supported by cargo lift support structure and mechanism means 49. FIG. 3L shows the same embodiment as FIG. 3K but with the cargo lift deployed and the cargo lift platform 48 in its "down and horizontal" and "ready to load" position. Electrical, hydraulic, pneumatic or other lift means as are know from the prior art, could be utilized to lift the cargo lift platform 48 along with any cargo thereon. Thus FIGS. 3K and 3L illustrate an embodiment of a Recreational Vehicle further comprising deployable cargo lift means 47 at the aft end of said cargo bed 30, for facilitating the loading and unloading of cargo into and from said cargo bed.

FIG. 4 shows a rear view of the embodiment of FIG. 2. In this view the tailgate 32 behind the cargo bed 30, is seen between the extension 25 and the second extension 35. A cargo bed access door 50 is shown for permitting the camping occupant to move from within the interior of the compartment in the body of the Recreational Vehicle, onto the open-top cargo bed 30. The cargo bed access door 50 may be of hinged, multi-panel, bi-fold, sliding or other door type as is known from prior art door designs. Thus FIG. 4 illustrates cargo bed access door means for permitting said camping occupant to traverse from within the compartment (inside the Recreational Vehicle) to said cargo bed 30. An optional window 51 can be incorporated into the access door 50, as illustrated. Optional windows 52 can also be incorporated into the aft ends of extension 25 and second extension 35, as illustrated, and these optional windows 52 can optionally be frosted, one-way glass, one-way mirrored on the interior side, and/or openable. Optional high-mounted brake light locations 57 are also illustrated in FIG. 4.

Figure 5A:
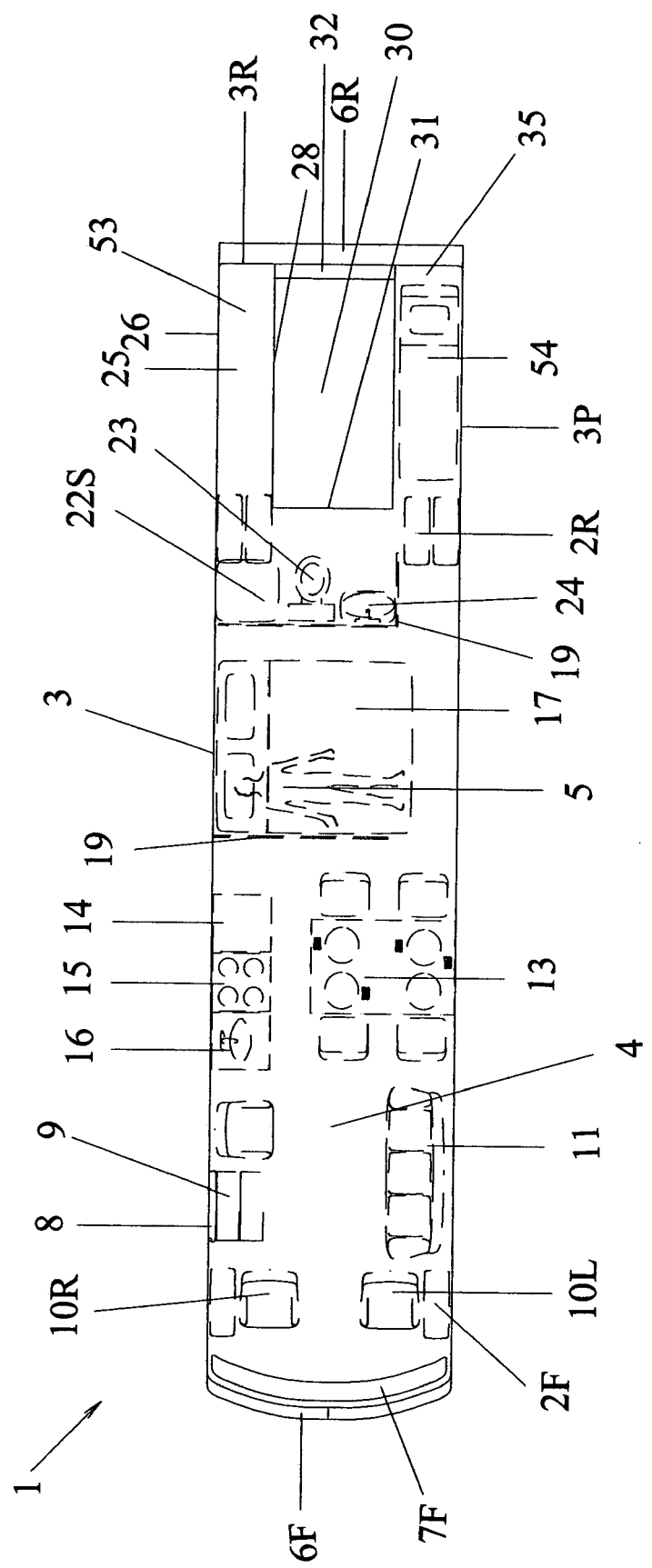
FIG. 5A shows a plan view of an embodiment similar to that of FIG. 2, fitted with a walk-in closet in an interior extension laterally adjacent to the cargo bed and fitted with a single bed in a second interior extension on the other side of the cargo bed.

FIG. 5A shows a plan view of an embodiment similar to that of FIG. 2, fitted with a walk-in closet 53 in extension 25 laterally adjacent to the cargo bed 30 and fitted with a single bed 54 in second extension 35 on the other side of the cargo bed. In this embodiment partitions 19 are shown separating the bedroom area from the dining area and the bathroom area, respectively. Doors are not shown, but either doors or curtains or other partitioning means known from the prior art could be used to separate the dining area, the master bedroom area, the single bed area, the bathroom area, and the walk-in closet area. The walk-in closet 53 provides beneficial use means for permitting extension 25 to be used by a camping occupant for at least one beneficial camping-related use, wherein said beneficial use means comprises a walk-in closet situated at least in part in the extension 25, which closet is usable by said camping occupant for storing and retrieving articles such as articles of clothing. The single bed 54 provides beneficial use means for permitting (second) extension 35 to be used by a camping occupant for at least one beneficial camping-related use, wherein said beneficial use means comprises a longitudinally-oriented bed situated at least in part in said (second) extension 35. Clearly the walk-in closet and the single bed could be switched left to right in alternate embodiments of Recreational Vehicles.

Figure 5B:
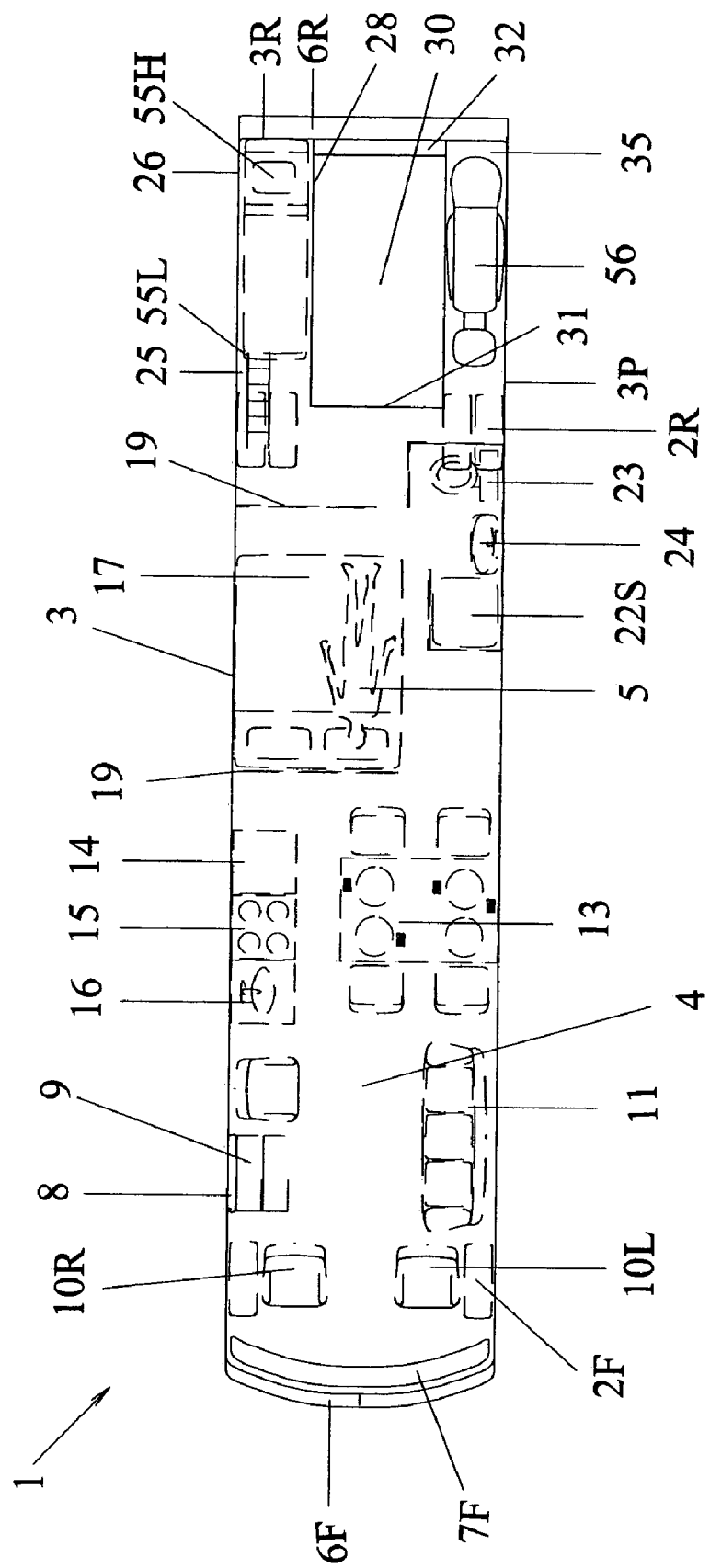
FIG. 5B shows a plan view of an embodiment similar to that of FIG. 2, fitted with stacked bunk beds in an interior extension laterally adjacent to the cargo bed and fitted with a recliner-type seat in a second extension on the other side of the cargo bed.

FIG. 5B shows a plan view of an embodiment similar to that of FIG. 2, fitted with stacked bunk beds 55L and 55H in an interior extension 25 laterally adjacent to the cargo bed 30 and fitted with a recliner-type seat 56 in a second extension 35 on the other side of the cargo bed 30. Thus beneficial use means are provided for permitting extension 25 to be used by a camping occupant for at least one beneficial camping-related use, wherein said beneficial use means comprises at least two vertically separated longitudinally-oriented bunk beds (illustrated in 55L and 55H) which are situated at least in part in said extension 25. Also, beneficial use means are provided for permitting (second) extension 35 to be used by a camping occupant for at least one beneficial camping-related use, wherein said beneficial use means comprises a recliner-type seat 56 situated at least in part in said (second) extension 35. Clearly the recliner-type seat and the bunk beds could be switched right to left in alternate embodiments of Recreational Vehicles.

Figure 5C:
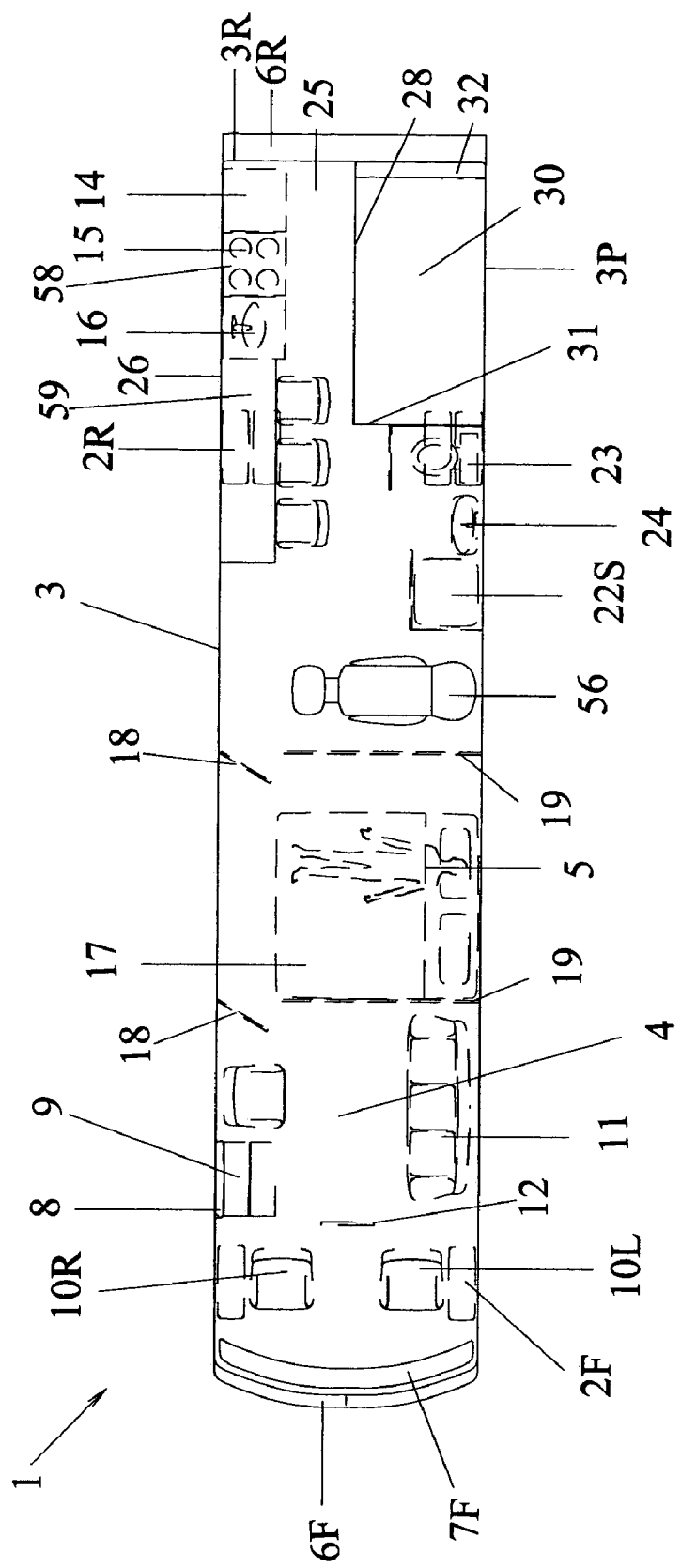
FIG. 5C shows a plan view of an embodiment fitted with a cooking and dining area in an interior extension laterally adjacent to the cargo bed.

FIG. 5C shows a plan view of an embodiment fitted with a cooking and dining area in an interior extension 25 laterally adjacent to the cargo bed 30. Beneficial use means are provided for permitting extension 25 to be used by a camping occupant for at least one beneficial camping-related use, wherein said beneficial use means comprises means for cooking 58 situated at least in part in said extension 25, and wherein said beneficial means further comprises means for dining 59 situated at least in part in said extension 25.

Figure 5D:
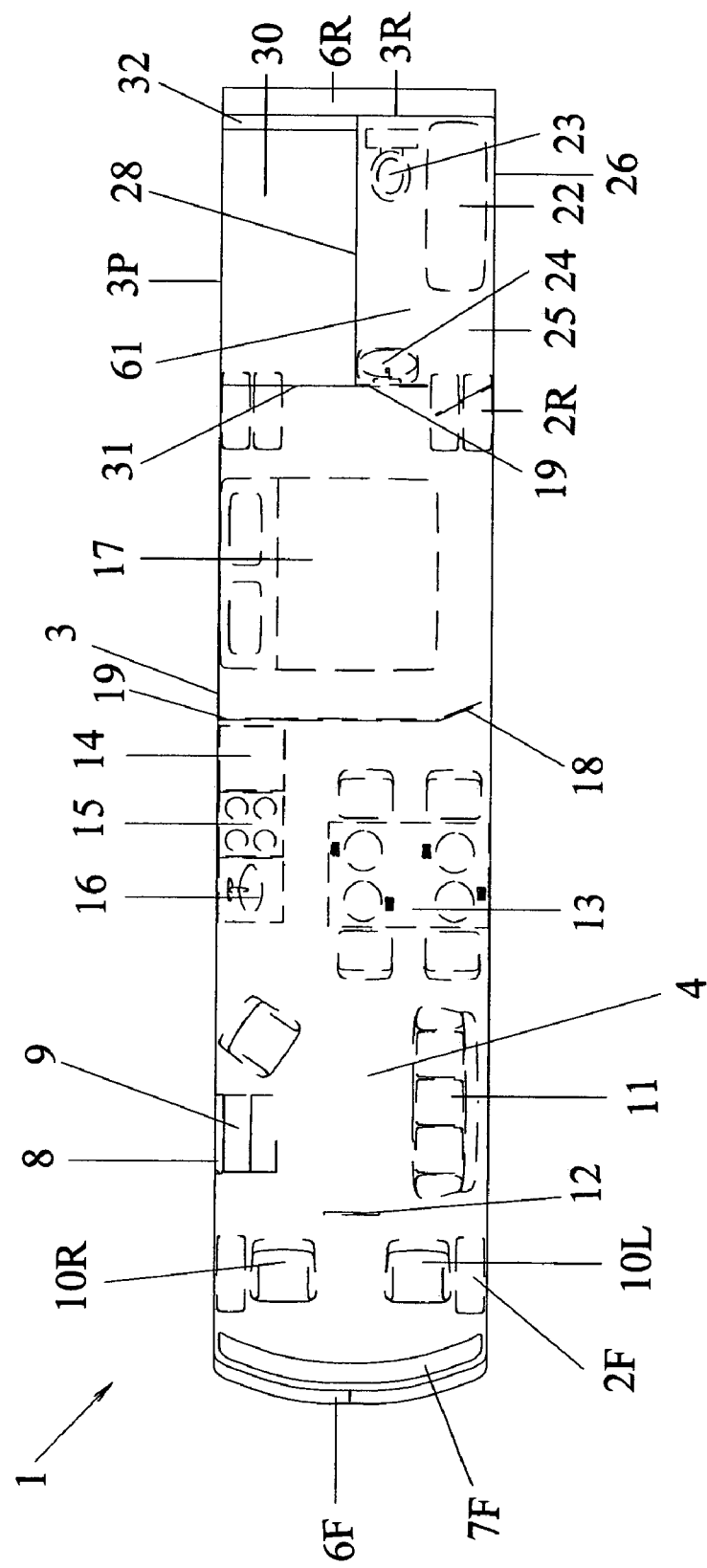
FIG. 5D shows a plan view of an embodiment fitted with a bathroom in an interior extension laterally adjacent to the cargo bed.

FIG. 5D shows a plan view of an embodiment similar to that of FIG. 2, fitted with a bathroom 61 in an interior extension laterally adjacent to the cargo bed. Beneficial use means are provided for permitting extension 25 to be used by a camping occupant for at least one beneficial camping-related use, wherein said beneficial use means comprises means for bathing suitable for use by said camping occupant for bathing, which means for bathing is situated at least in part in said extension 25, and further comprises toilet means suitable for use by said camping occupant for at least one or urination or defecation, which toilet means is situated at least in part in said extension 25. FIG. 5D also illustrates a Recreational Vehicle 1 wherein the cargo bed 30 is of sufficient size and shape to accommodate a mattress (not shown) for permitting said camping occupant to sleep thereon, and for enabling "outdoor sleeping" when so desired.

Figure 6A:
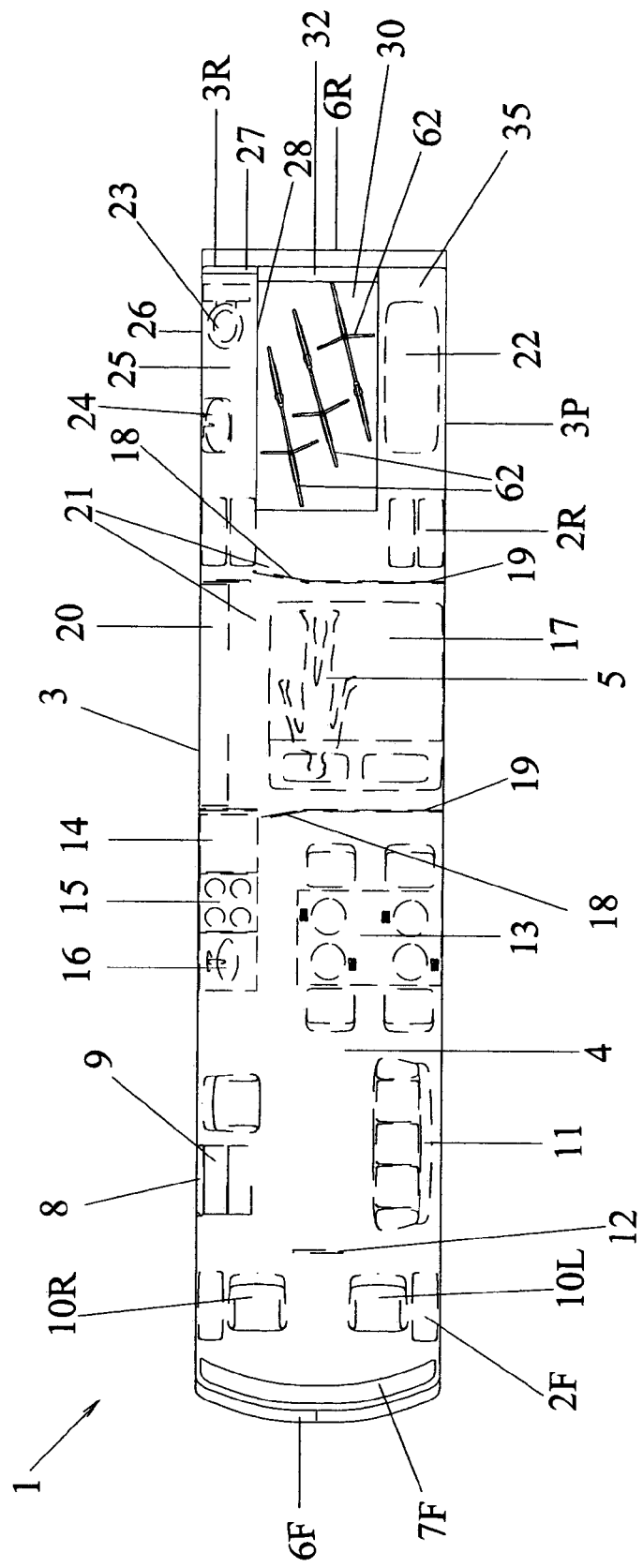
FIG. 6A shows a plan view of an embodiment similar to that of FIG. 2, with a plurality of bicycles in the cargo bed.

FIG. 6A shows a plan view of an embodiment similar to that of FIG. 2, with a plurality of bicycles 62 in the cargo bed 30. Thus this embodiment illustrates a cargo bed 30 which is of sufficient size and shape to enable carriage of more than one bicycle.

Figure 6B:
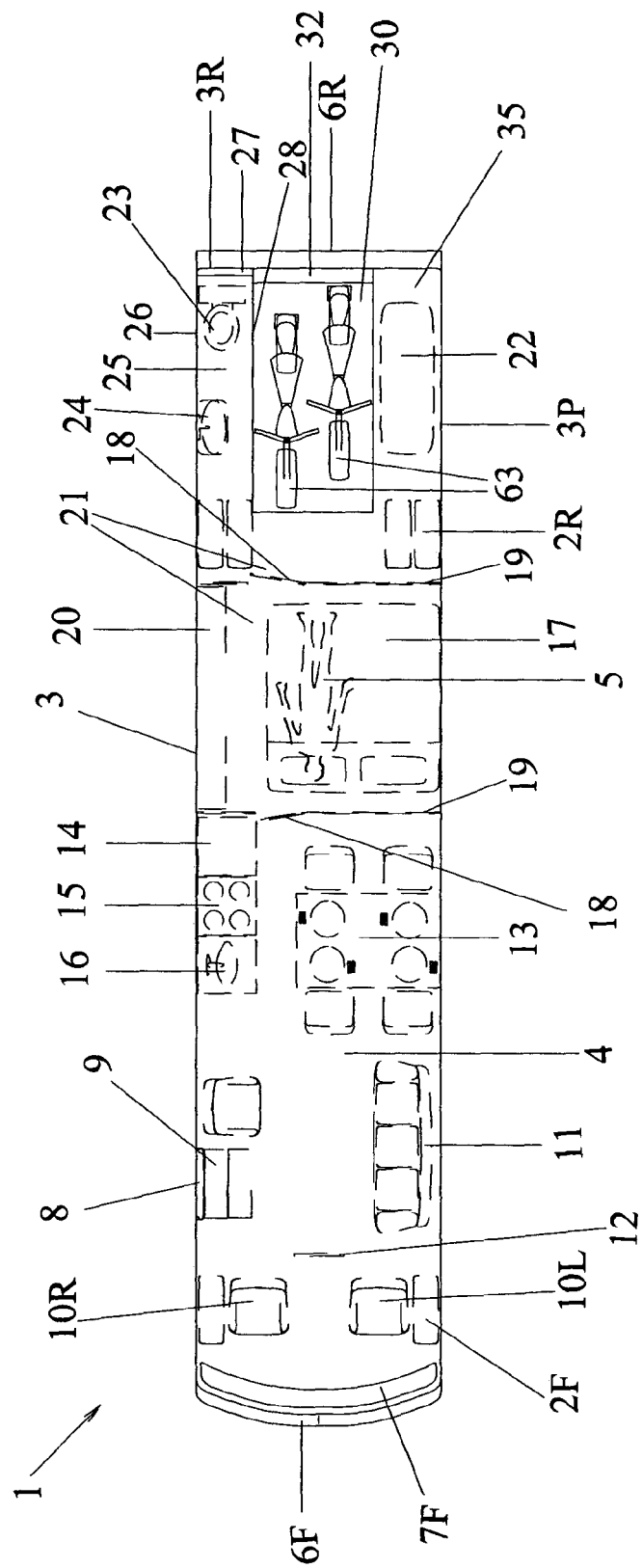
FIG. 6B shows a plan view of an embodiment similar to that of FIG. 2, with two motorcycles in the cargo bed.

FIG. 6B shows a plan view of an embodiment similar to that of FIG. 2, with a couple of motorcycles 63 in the cargo bed. Thus this embodiment illustrates a cargo bed 30 which is of sufficient size and shape to enable carriage of a motorcycle.

Figure 6C:
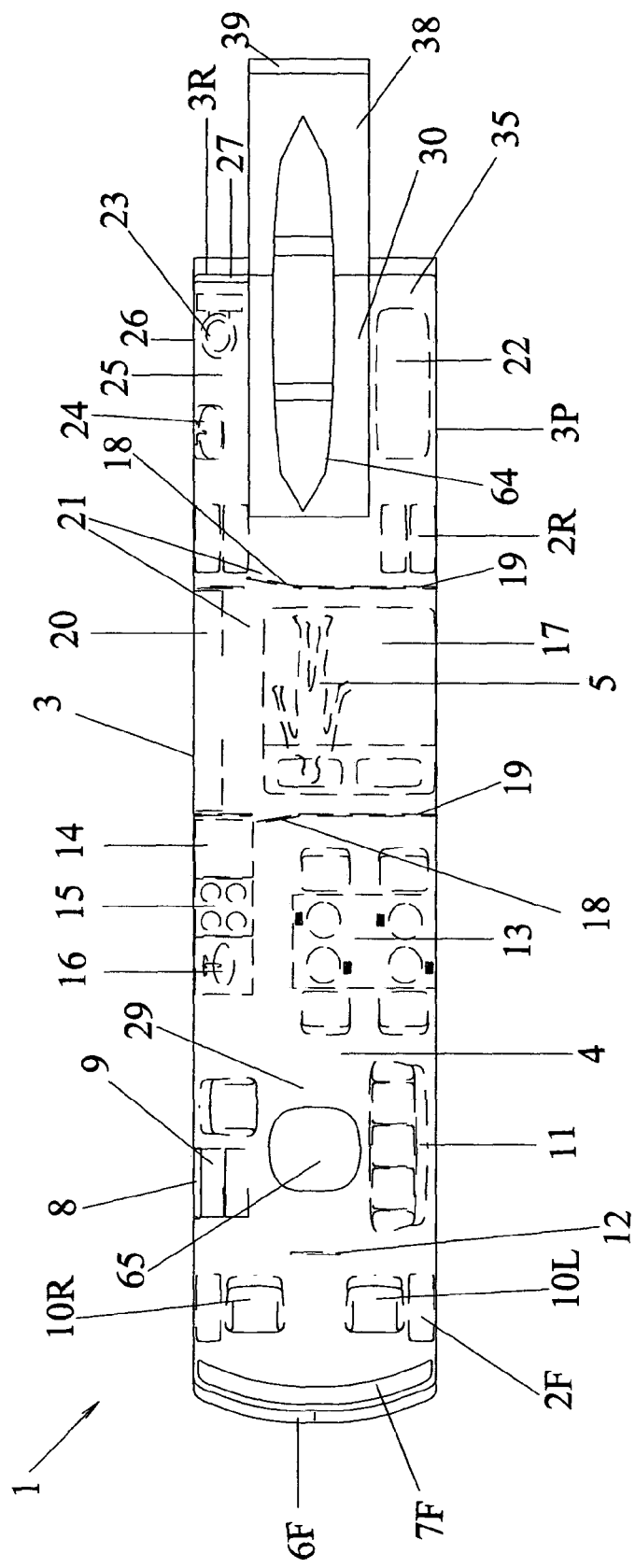
FIG. 6C shows a plan view of an embodiment similar to that of FIG. 3F, with a canoe in the combined space of a cargo bed and cargo bed extension. This embodiment also illustrates a skylight.

FIG. 6C shows a plan view of an embodiment similar to that of FIG. 3F, with a canoe 64 on the cargo bed 30 and on the cargo bed extension floor 38. Thus this embodiment illustrates a cargo bed which is of sufficient size and shape to enable carriage of a boat such as a canoe. This embodiment also shows a roof 29 wherein said roof includes at least one skylight 65, for providing natural sunlight in the compartment 4.

Figure 6D:
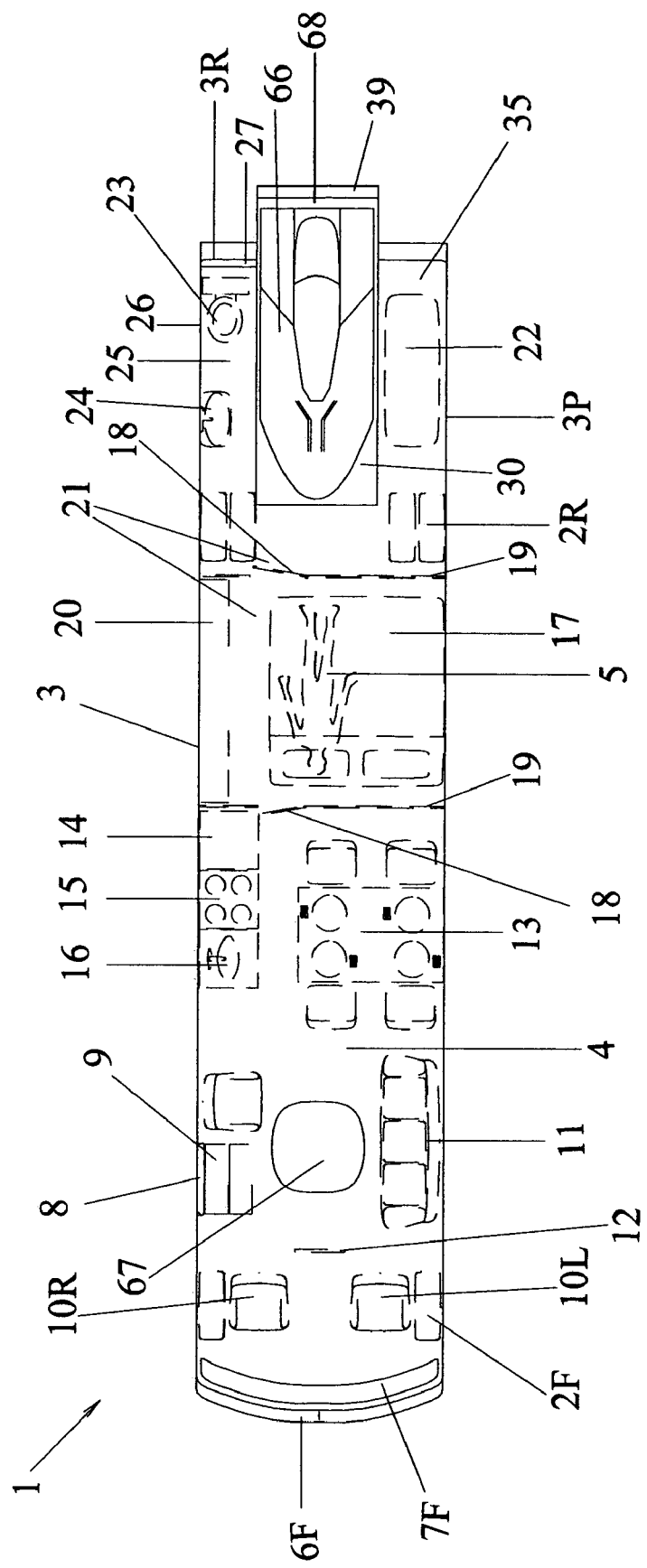
FIG. 6D shows a plan view of an embodiment with a water-scooter in a cargo bed.

FIG. 6D shows a plan view of an embodiment with a water-scooter 66 in a cargo bed 30 with a tailgate bed-extender 68. Thus this embodiment shows that the cargo bed (with tailgate bed-extender included) is of sufficient size and shape to enable carriage of a water-scooter. The tailgate bed-extender 68 serves as deployable means for extending said cargo bed, which deployable means include an extension surface which serves as a cargo bed extension floor when said deployable means are deployed, and which extension surface serves as a tailgate surface for said cargo bed when said deployable means are undeployed. This embodiment also illustrates installation of a sunroof 67 in the roof 29 of the Recreational Vehicle; thus illustrating that the roof 29 includes at least one openable sunroof section serving as means for allowing sunshine and fresh air into the compartment 4 on days when the weather is suitable.

Figure 6E:
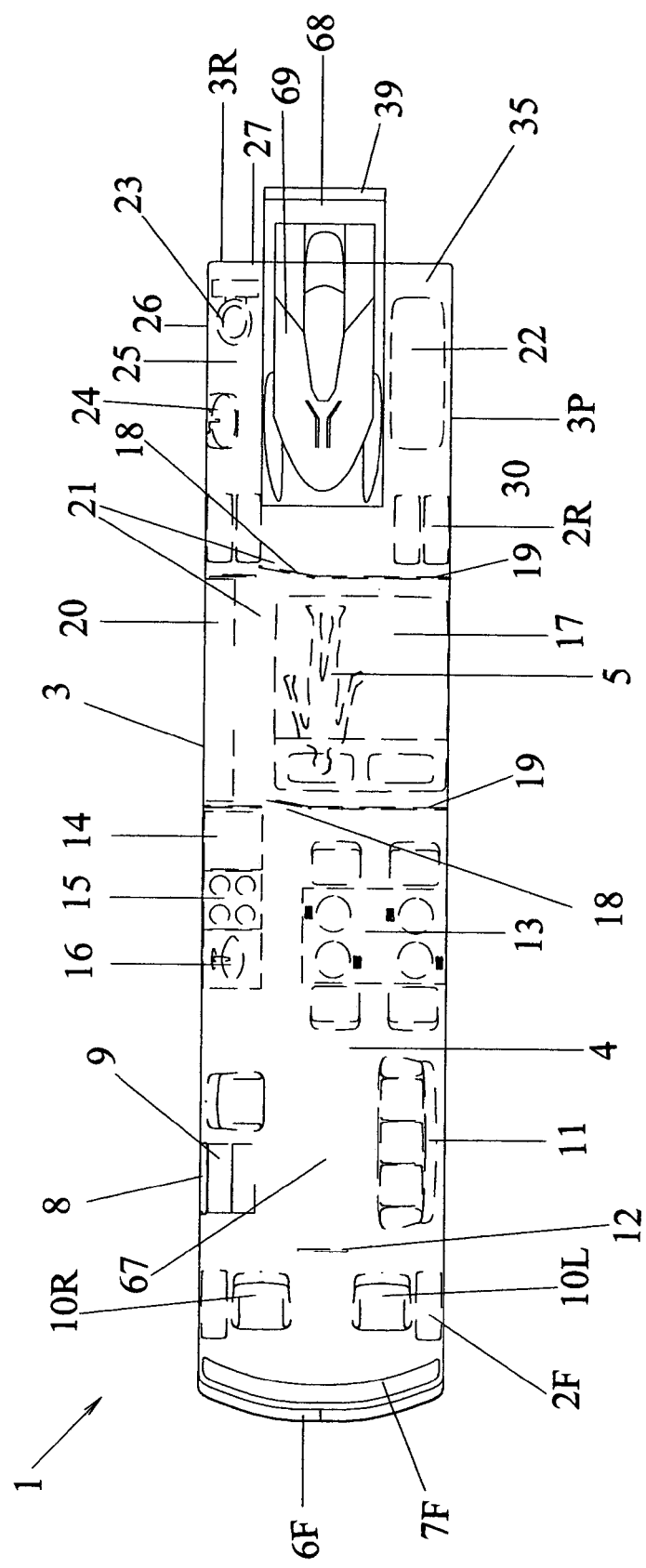
FIG. 6E shows a plan view of an embodiment with a snowmobile in a cargo bed.

FIG. 6E shows a plan view of an embodiment with a snowmobile 69 in a cargo bed 30 with a tailgate bed-extender 68. Thus this embodiment shows that the cargo bed (with tailgate bed-extender included) is of sufficient size and shape to enable carriage of a snowmobile.

Figure 6F:
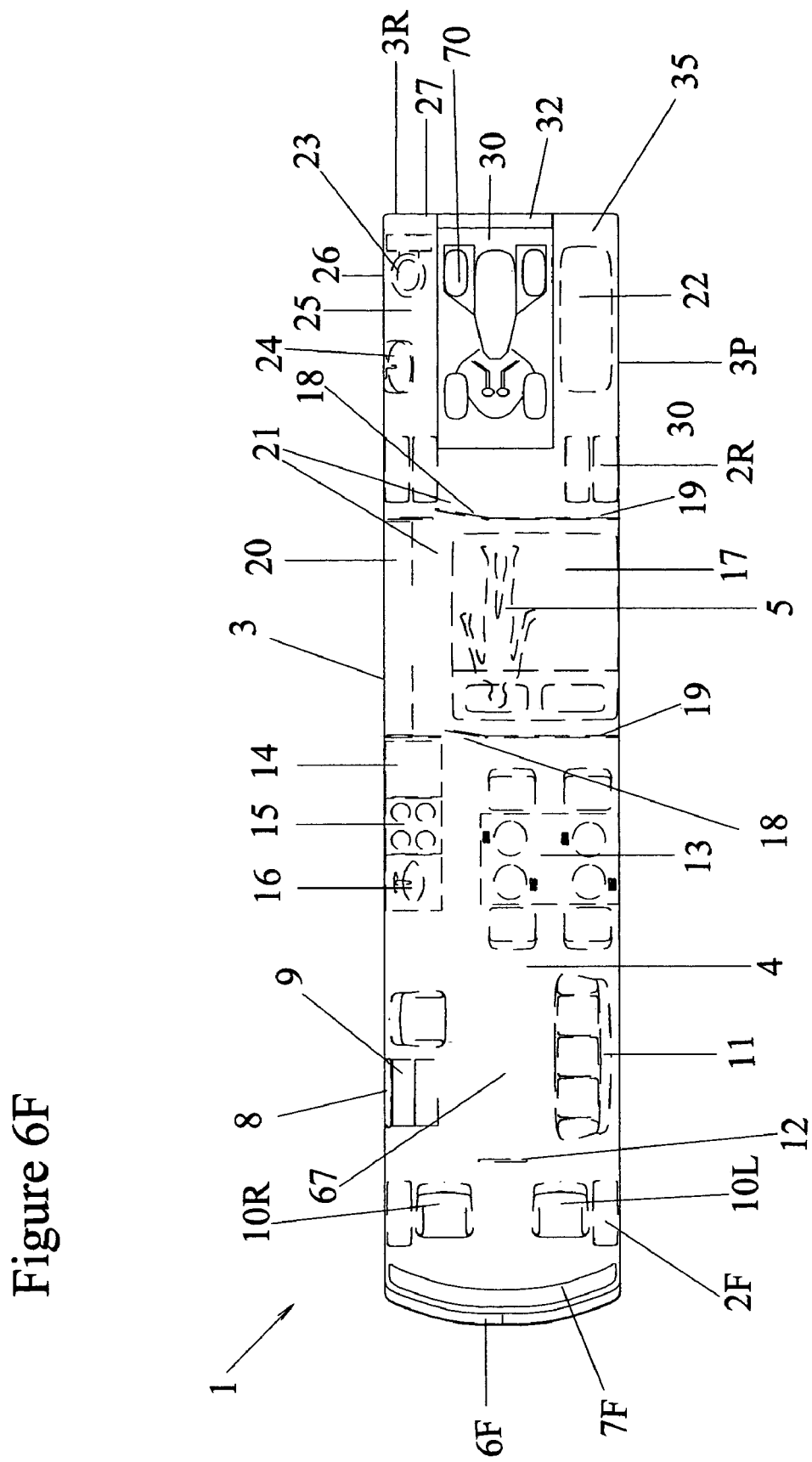
FIG. 6F shows a plan view of an embodiment similar to that of FIG. 2, with an All-Terrain-Vehicle (ATV) in the cargo bed.

FIG. 6F shows a plan view of an embodiment similar to that of FIG. 2, with an All-Terrain-Vehicle (ATV) 70 in the cargo bed. Thus this embodiment shows that the cargo bed is of sufficient size and shape to enable carriage of an All-Terrain-Vehicle.

Figure 6G:
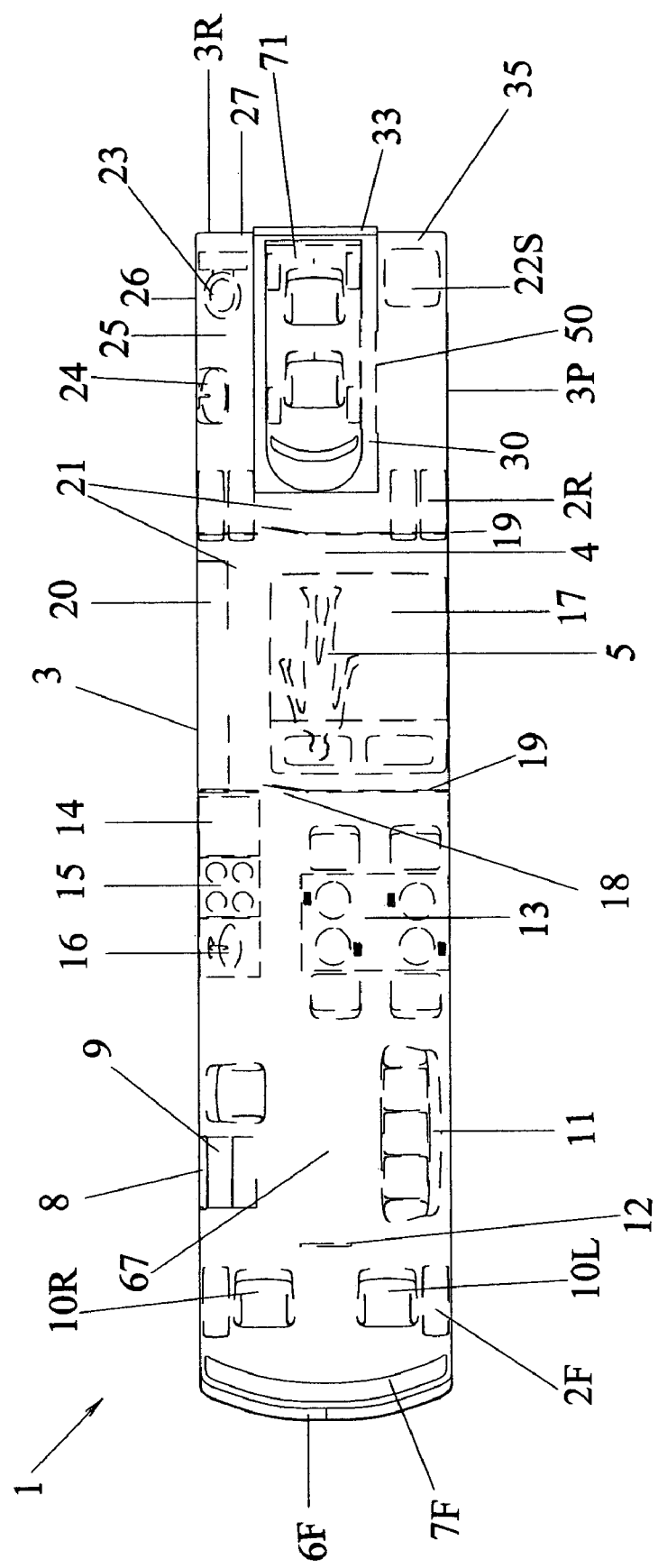
FIG. 6G shows a plan view of an embodiment similar to that of FIG. 2, with a narrow automobile in the cargo bed.

FIG. 6G shows a plan view of an embodiment similar to that of FIG. 3C, with a narrow automobile 71 (such as for a representative example the 'Tango', U.S. Pat. No. 6,328,121) in the cargo bed 30. Thus this embodiment shows that the cargo bed is of sufficient size and shape to enable carriage of a narrow automobile or microcar. A cargo bed access door 50 is also illustrated, of a sliding door type, to enable an occupant to traverse from the narrow automobile when it is on the cargo bed 30, into the compartment 4. Thus FIG. 6G also illustrates cargo bed access door means for permitting a camping occupant to traverse from within the compartment 4 inside the Recreational Vehicle 1 to said cargo bed 30.

Figure 6H:
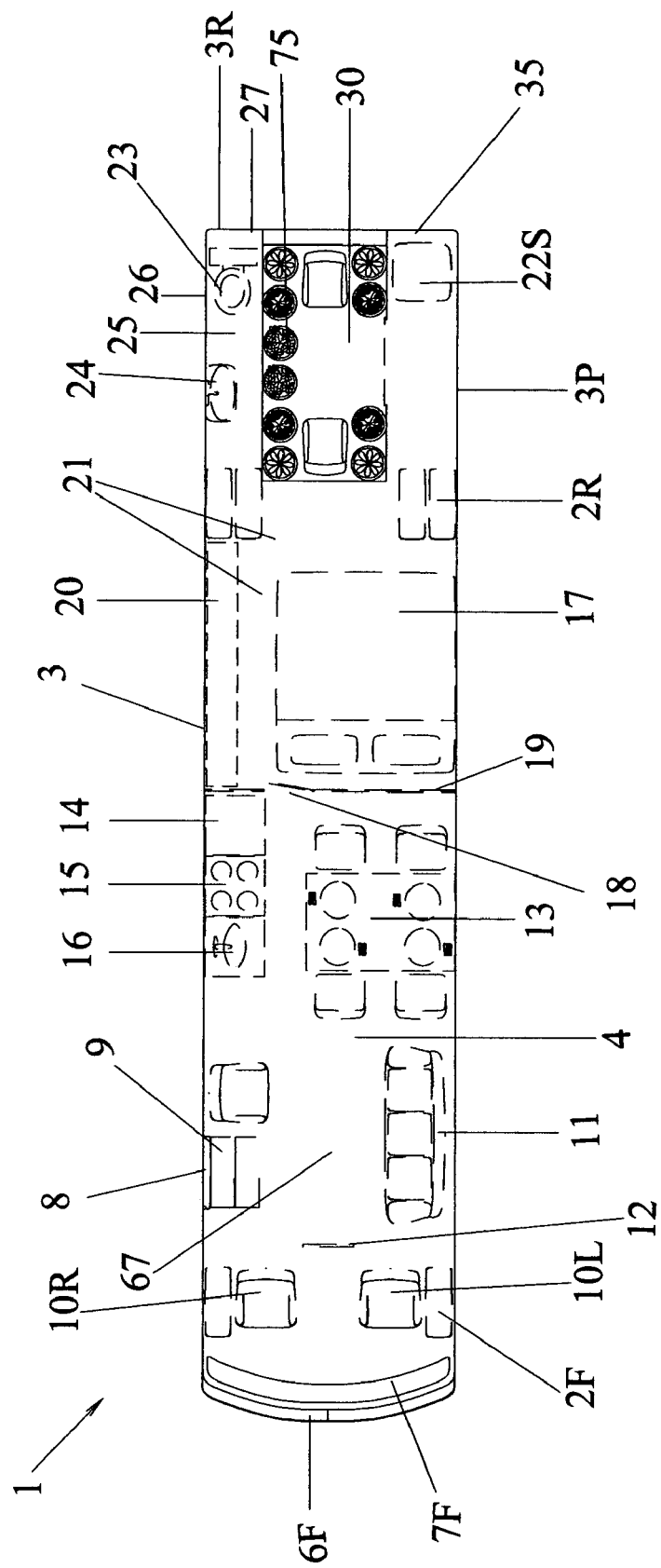
FIG. 6H shows a plan view of an embodiment similar to that of FIG. 2, with a garden area in the cargo bed.

FIG. 6H shows a plan view of an embodiment similar to that of FIG. 2, with a garden area 75 in the cargo bed 30. Thus this embodiment illustrates a Recreational Vehicle wherein said cargo bed is of sufficient size and shape to accommodate a garden area with living plants.

Figure 6I:
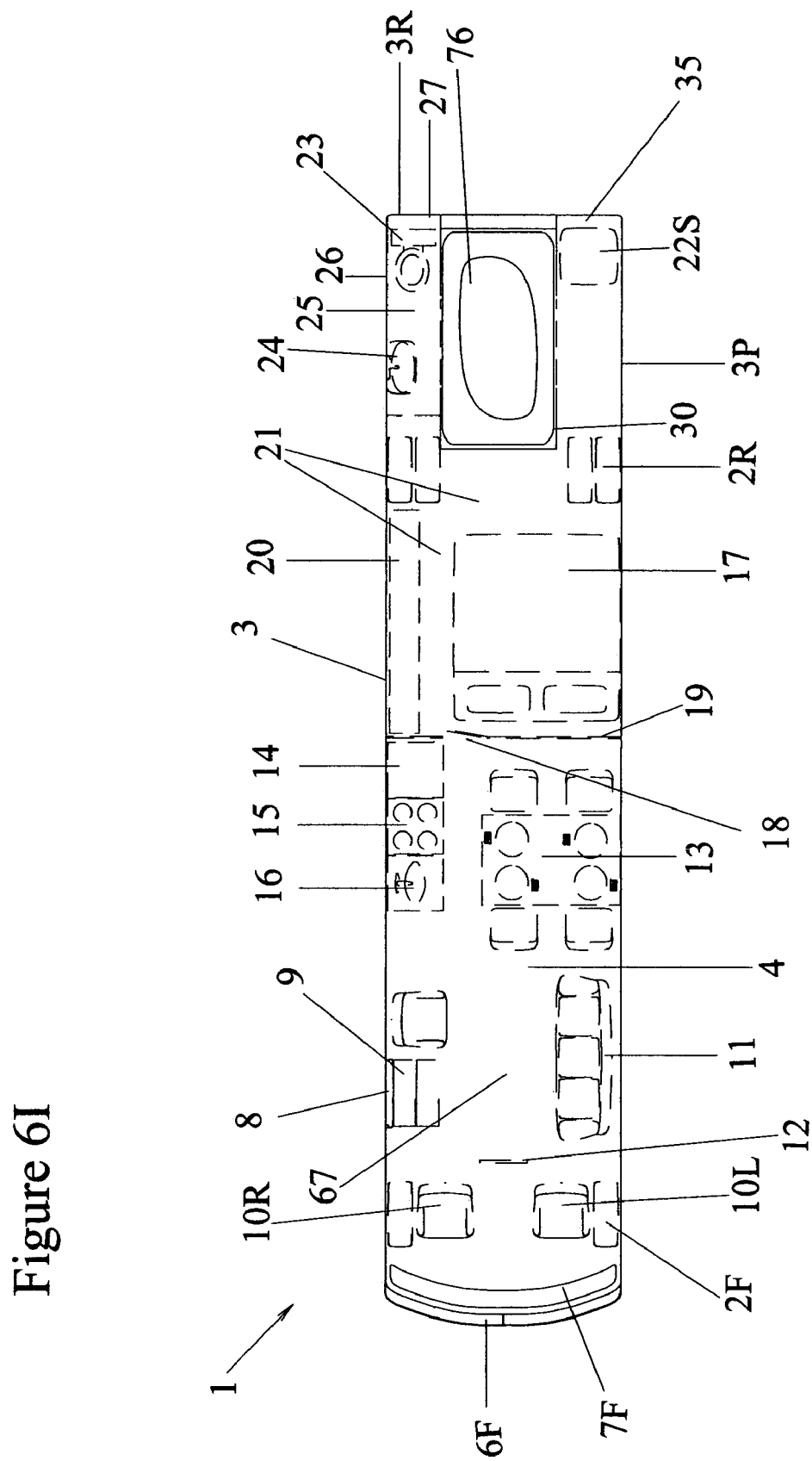
FIG. 6I shows a plan view of an embodiment similar to that of FIG. 2, with a hot tub/jetted tub in the cargo bed.

FIG. 6I shows a plan view of an embodiment similar to that of FIG. 2, with a hot tub/jetted tub 76 in the cargo bed 30. Thus this embodiment illustrates a Recreational Vehicle wherein said cargo bed is of sufficient size and shape to accommodate a hot tub for use by said camping occupant.

Figure 6J:
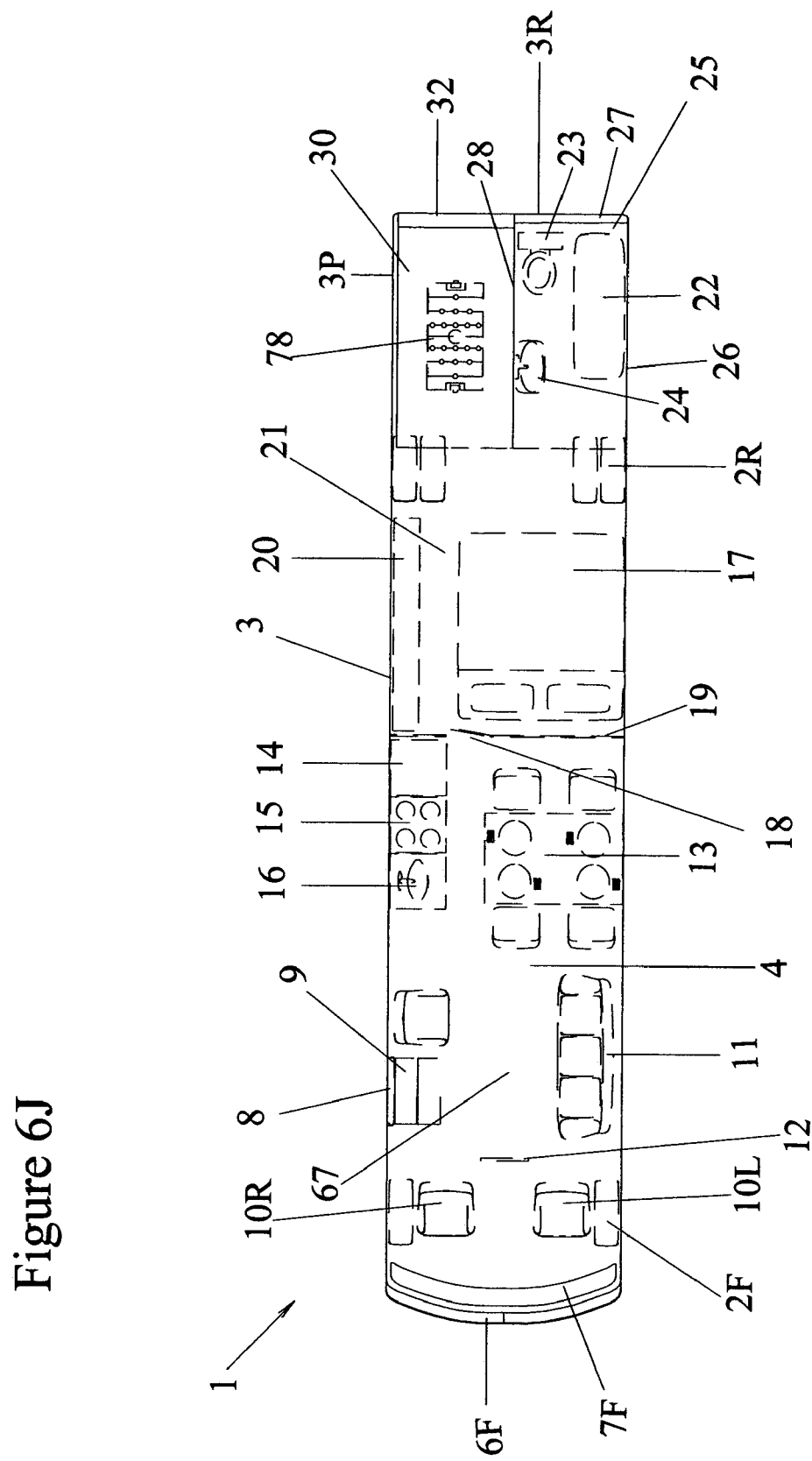
FIG. 6J shows a plan view of an embodiment with a game table in the cargo bed.

FIG. 6J shows a plan view of an embodiment with a game table 78 in the cargo bed 30. Thus this embodiment illustrates a Recreational Vehicle wherein said cargo bed is of sufficient size and shape to accommodate a game table for use by said camping occupant. Examples of games or sports that can be played or simulated on the game table include soccer, football, hockey, ice-hockey, air hockey, tennis or table tennis, pool or billiards, basketball, baseball, cricket, rugby and/or other games or sports as known from the prior art.

Figure 7A:
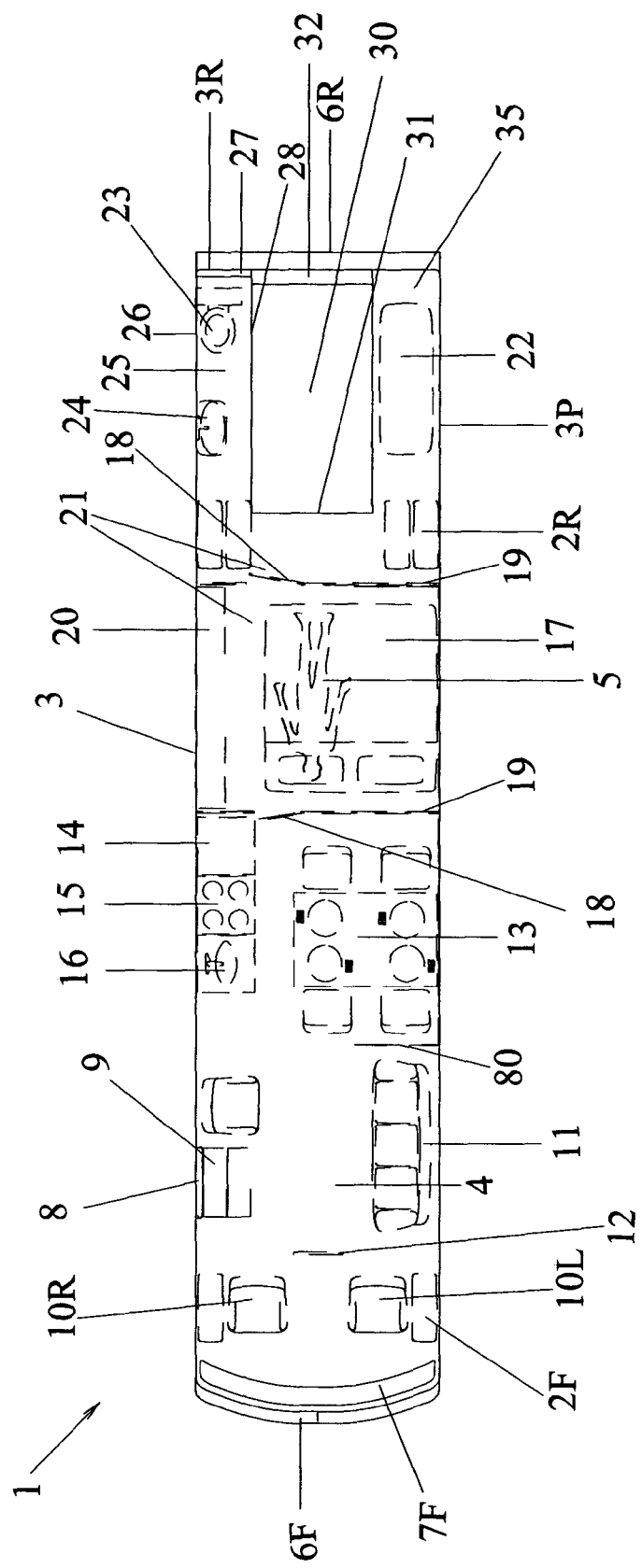
FIGS. 7A and 7B show plan views of an alternate embodiment with a class A motorhome with a slide-out undeployed and deployed, respectively.
Figure 7B:
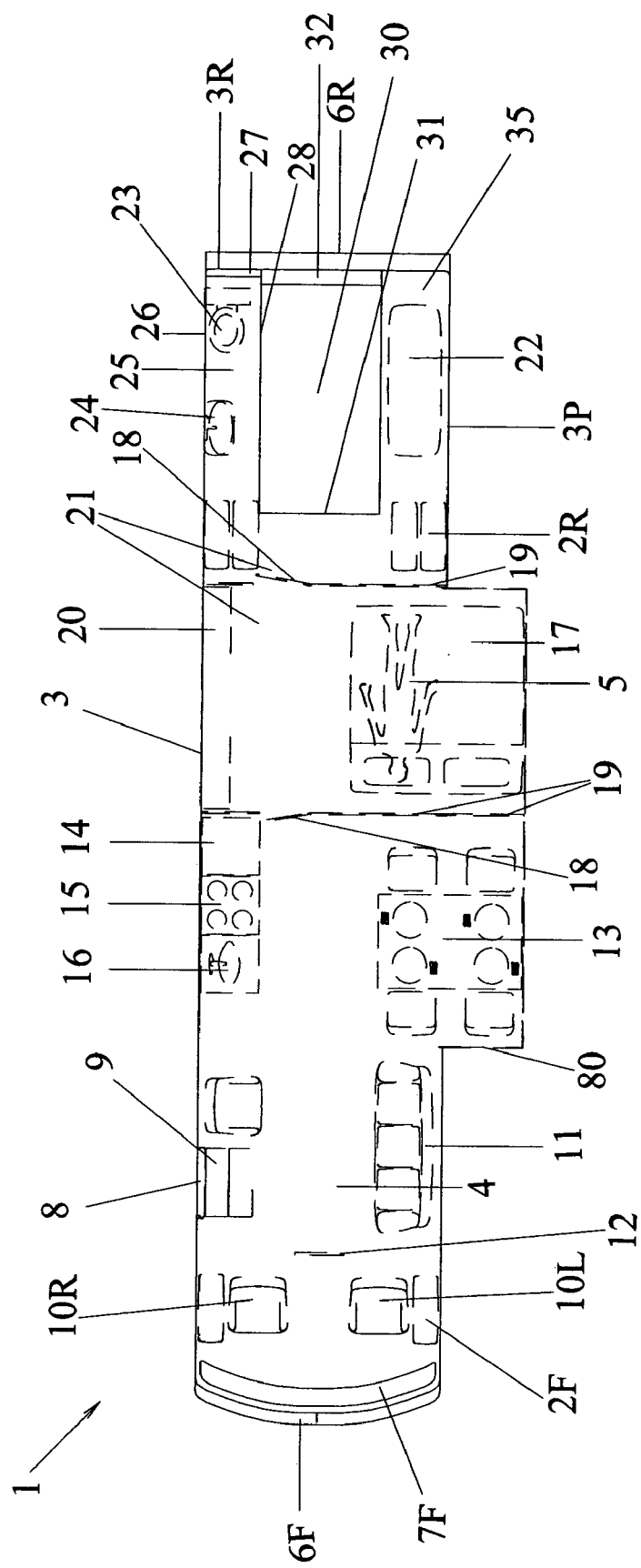

FIGS. 7A and 7B show plan views of an alternate embodiment with a class A motorhome with a slide-out 80 undeployed and deployed, respectively. The slide-out 80 serves as slide-out means for increasing the interior volume and spaciousness of said compartment 4 while said Recreational Vehicle is in a parked condition. Thus FIGS. 7A and 7B illustrate slide-out means for increasing the interior volume of the compartment 4 while said Recreational Vehicle 1 is in a parked condition.

Figure 8A:
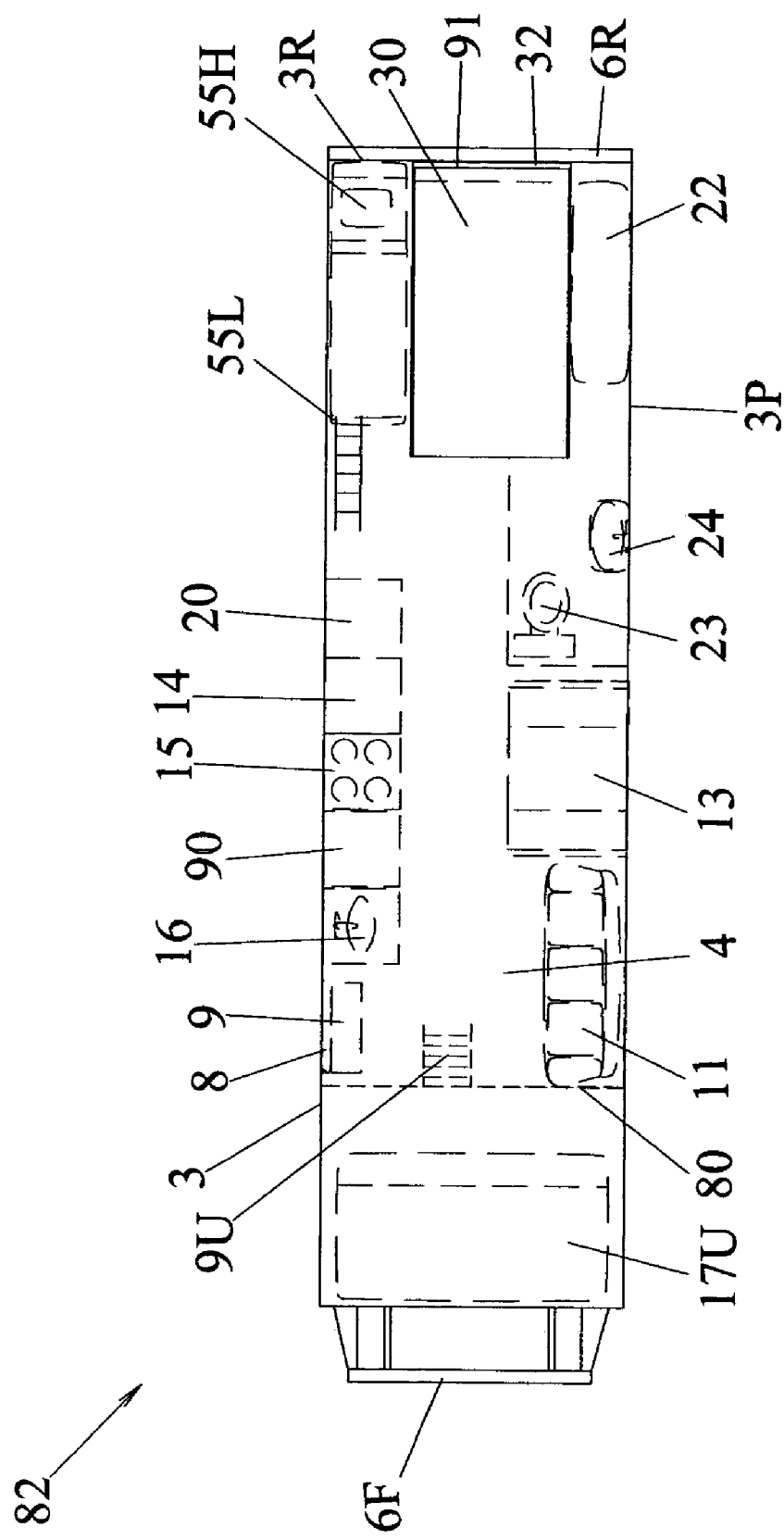
FIGS. 8A and 8B show plan views of a class C motorhome embodiment with a slide-out undeployed and deployed, respectively.
Figure 8B:
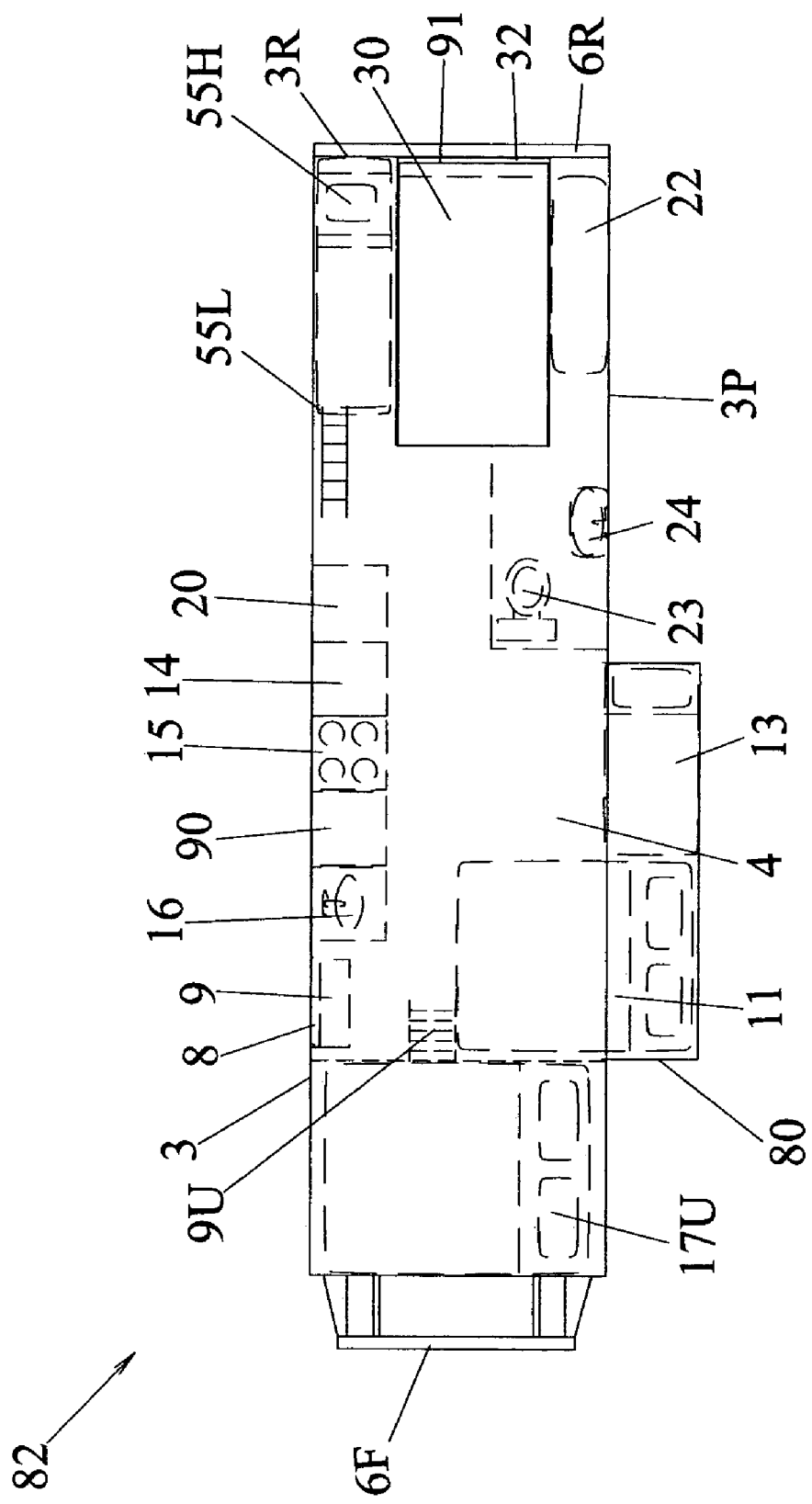

FIGS. 8A and 8B show plan views of a class C motorhome 82 which comprises an embodiment with a slide-out 80 undeployed and deployed, respectively. Thus FIGS. 8A and 8B illustrate slide-out means for increasing the interior volume of the compartment 4 while said Recreational Vehicle (class C motorhome 82) is in a parked condition. Note that in the undeployed or day configuration of FIG. 8A, the sofa-bed 11 is in sofa configuration, the upper level queen bed 17U is folded, and a dinette 13 is deployed. As in the embodiment of FIG. 5B, this embodiment illustrates stacked bunk beds 55L and 55H in an interior extension 25 laterally adjacent to the cargo bed 30. The embodiment also illustrates a dishwasher 90, a nonpermanent cover 91 over the cargo bed 30, and upper level stairs 9U leading from the main level to an upper level above the vehicle's driver's cab, in which upper level the upper level queen bed 17U is located. The nonpermanent cover 91, which may be of a roll-out, fold-out and/or slide-out design, provides nonpermanent means for covering the top of said cargo bed 30 on an as-desired basis. In the slide-out deployed or night configuration illustrated in FIG. 8B, the upper level queen bed 17U is unfolded and deployed for use, the sofa-bed 11 is in a bed configuration, and the area which had the dinette 13 deployed is now converted to deploy a single bed 13 instead. Thus in the night configuration up to seven people can sleep on the beds provided.

Figure 9:
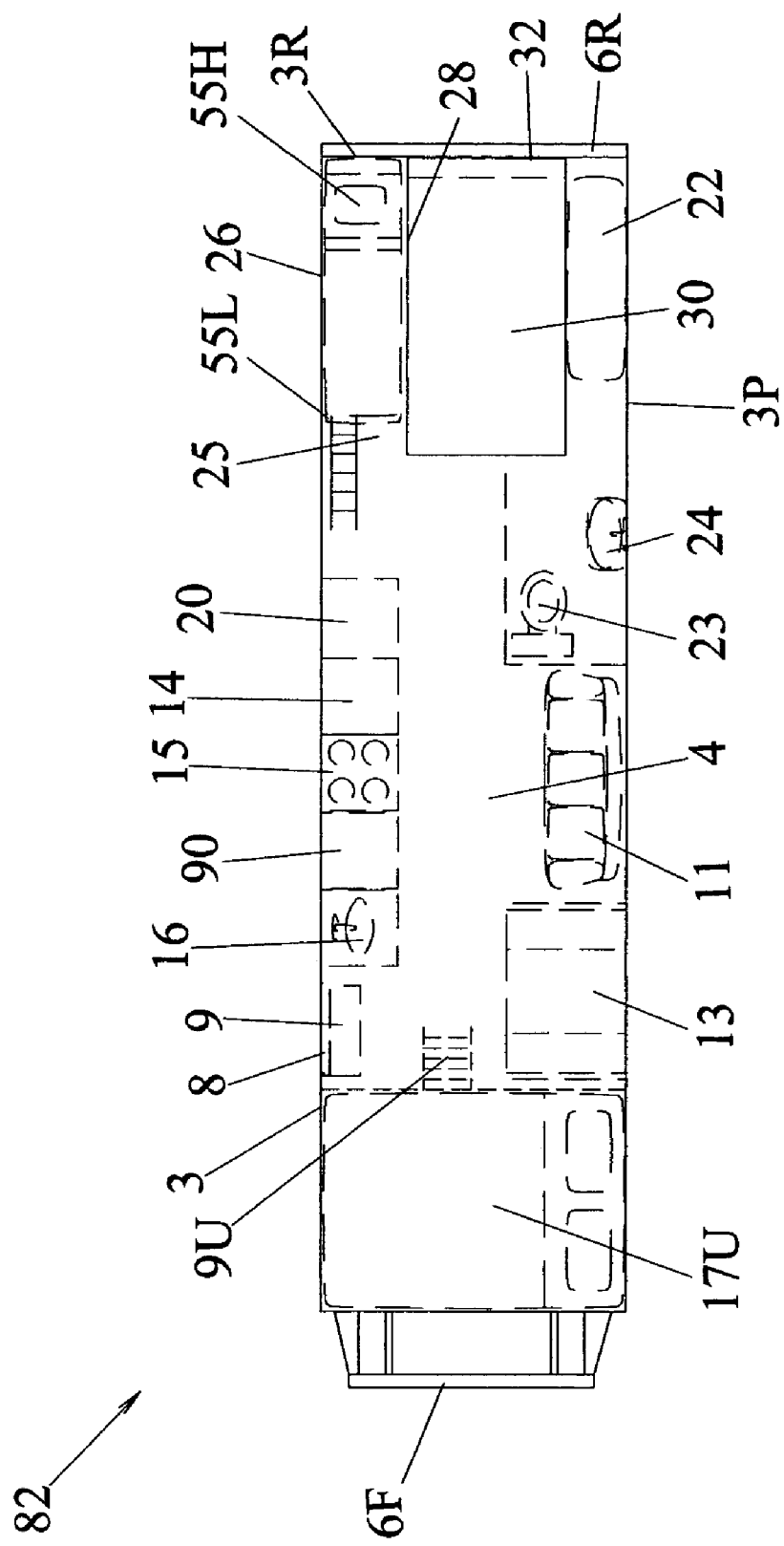
FIG. 9 shows a plan view of an alternate embodiment of a class C motorhome without a slide-out.

FIG. 9 shows a plan view of an alternate embodiment of a class C motorhome 82 without a slide-out.

Figure 10:
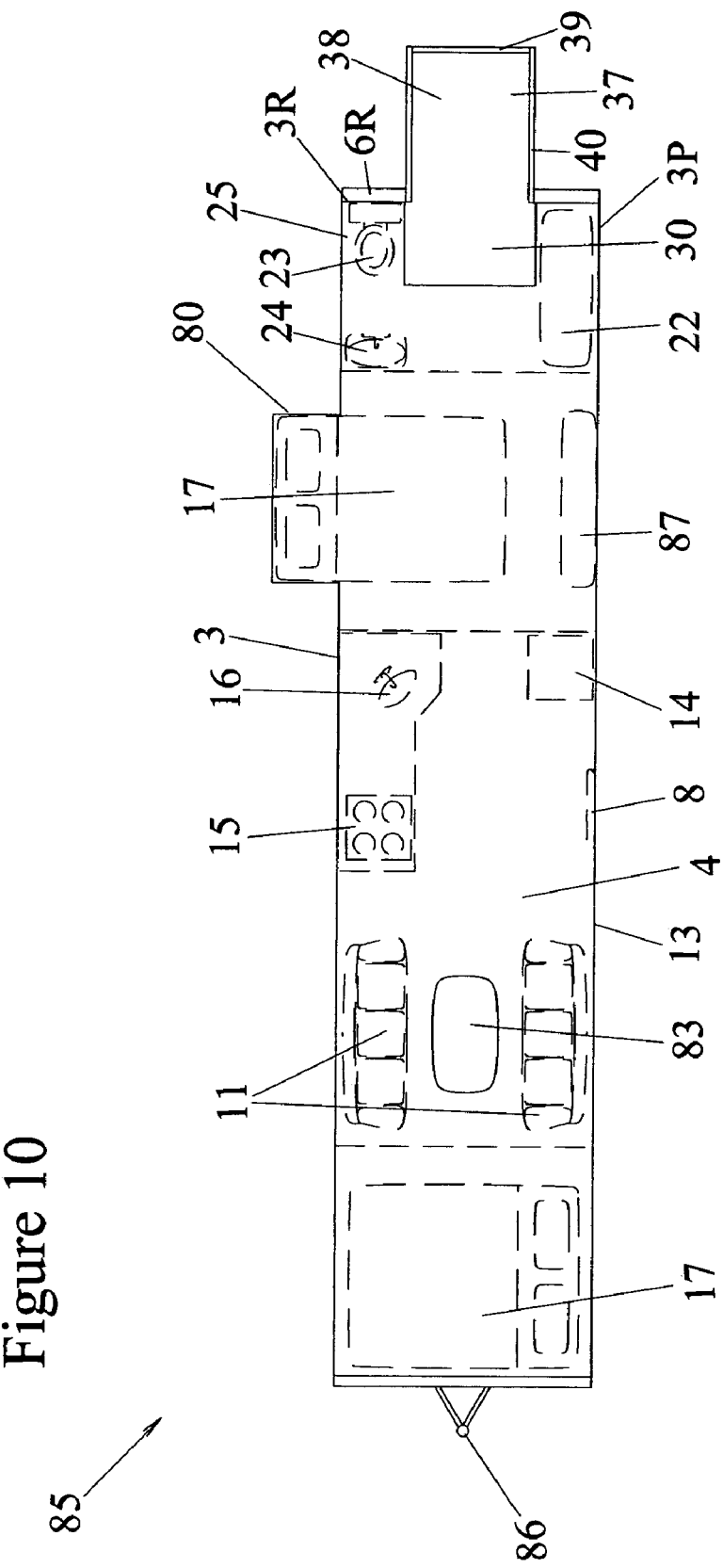
FIG. 10 shows a plan view of a travel trailer embodiment designed for towing behind an automotive vehicle.

FIG. 10 shows a plan view of a travel trailer 85 designed for towing behind an automotive vehicle. Thus in this embodiment the Recreational Vehicle is the travel trailer 85. A tow hitch connection fitting is designated as 86 in this Figure, and a table 83 is illustrated between two sofas 11. A cargo bed 30 and a cargo bed extension 37 and an extension tailgate 39 are shown with the cargo bed extension deployed, in a manner similar to the embodiment shown in FIG. 3F. The travel trailer embodiment of FIG. 10 is illustrated with two queen or comparable beds 17, a combined dresser and entertainment center 87, a slide-out 80 shown deployed, and a bathroom area arranged around the cargo bed. The embodiment of FIG. 10 illustrates a deployable cargo bed extension 37 for extending the cargo bed 30, which deployable cargo bed extension includes an extension surface which serves as a cargo bed extension floor 38 when said deployable cargo bed extension 37 is deployed (as illustrated), and which extension surface serves as a tailgate surface for said cargo bed 30 when said deployable cargo bed extension 37 is undeployed or folded up, as will be evident.

Figure 11:
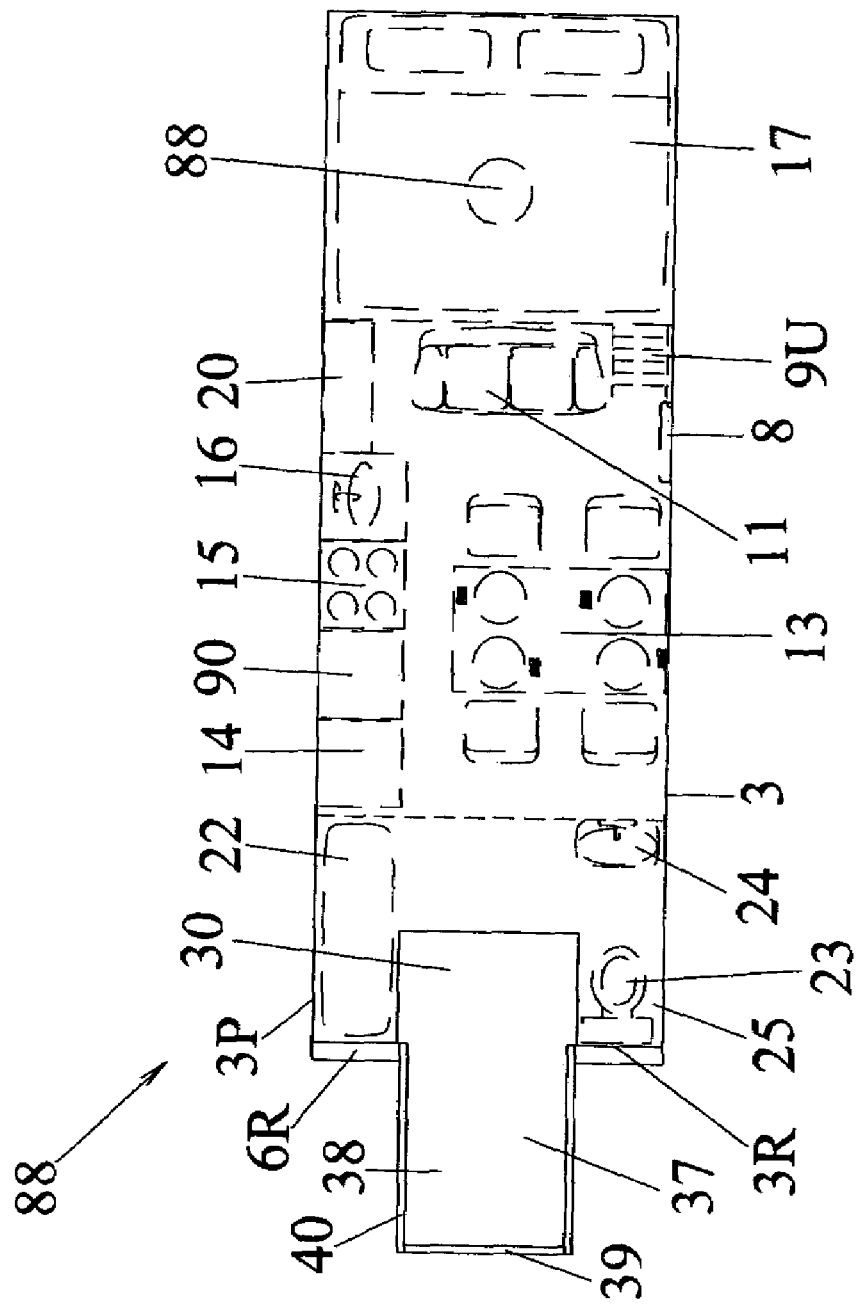
FIG. 11 shows a plan view of a fifth-wheel type camper trailer embodiment designed for towing behind a suitably-equipped pickup truck.

FIG. 11 shows a plan view of a fifth-wheel type camper trailer embodiment 88 designed for towing behind a suitably-equipped pickup truck, with 89 indicating the connection fitting to support the front end of the fifth-wheel type camper trailer above the pickup bed of said pickup truck. The cargo bed 30 and cargo bed extension 37 are similar to those illustrated for the travel trailer embodiment of FIG. 10.

Thus in this embodiment the Recreational Vehicle is the fifth-wheel type camper trailer 88.

While certain preferred embodiments have been illustrated and described in detail, it should be understood that further variations and modifications can be made within the spirit and scope of the attached claims.

What is claimed is:

1. A recreational vehicle comprising:
running gear means for permitting said Recreational Vehicle to move and maneuver upon a road surface;
a vehicle body supported by said running gear means, which vehicle body comprises a substantially enclosable compartment suitable for accommodating at least one camping occupant,
said compartment including an extension extending rearwardly substantially to a rear end of said body, said extension having a first side wall, a rear wall, and a second side wall, said second side wall spaced inwardly of an outer perimeter of the body,
with beneficial use means for permitting said extension to be used by said camping occupant for at least one beneficial camping-related use;
a roof extending over said compartment and over said extension included in said compartment; and
an open top cargo bed bounded at a forward edge by a rear wall of said compartment and at one side edge by said second side wall.

2. The recreational vehicle of claim 1, wherein said running gear means comprise at least four tires.

3. The recreational vehicle of claim 1, wherein said vehicle body includes means for accommodating a driver's seat and means for a driver for seeing outside said recreational vehicle Vehicle.

4. The recreational vehicle of claim 1, wherein said compartment includes seating means suitable for use by said camping occupant for sitting.

5. The recreational vehicle of claim 1, wherein said compartment includes a bed suitable for use by said camping occupant for sleeping.

6. The recreational vehicle of claim 1, wherein said compartment includes means for cooking suitable for use by said camping occupant for cooking.

7. The recreational vehicle of claim 1, wherein said compartment includes means for refrigeration suitable for use by said camping occupant for storing and preserving perishable foodstuffs.

8. The recreational vehicle of claim 1, wherein said compartment includes means for providing a dining table surface suitable for use by said camping occupant for dining.

9. The recreational vehicle of claim 1, wherein said compartment includes means for bathing suitable for use by said camping occupant for bathing.

10. The recreational vehicle of claim 1, wherein said compartment includes toilet means suitable for use by said camping occupant for at least one of urination and defecation.

11. The recreational vehicle of claim 1, further comprising door means for said camping occupant to enter said compartment from outside said Recreational Vehicle.

12. The recreational vehicle of claim 1, further comprising window means for said camping occupant for seeing outside said Recreational Vehicle, while located within said compartment.

13. The recreational vehicle of claim 1, further comprising slide-out means for increasing the interior volume of said compartment while said recreational vehicle is in a parked condition.

14. The recreational vehicle of claim 1, wherein said recreational vehicle is a motorhome.

15. The recreational vehicle of claim 1, wherein said recreational vehicle is a travel trailer.

16. In a recreational vehicle comprising a body and an interior compartment suitable for accommodating at least one camping occupant, the improvement comprising:
an extension to said compartment extending rearwardly substantially to a rear end of said body, said extension having a first side wall, a rear wall, and a second side wall, said second side wall spaced inwardly of an outer perimeter of the body,
adequate space means for said camping occupant to enter and use said extension;
a roof extending over said compartment and over said extension; and
an open top cargo bed bounded at a forward edge by a rear wall of said compartment and at one side edge by said second side wall.

17. A recreational vehicle comprising:
running gear means for permitting said recreational vehicle to move and maneuver upon a road surface;
a vehicle body supported by said running gear means, which vehicle body comprises a substantially enclosable compartment,
said compartment including two extensions extending rearwardly substantially to a rear end of said body;
a roof extending over said compartment and over said two extensions included in said compartment; and
an open top cargo bed bounded at a forward edge by a rear wall of said compartment and on its two side edges by said two extensions.

18. The recreational vehicle of claim 1, wherein said recreational vehicle is a fifth-wheel type camper trailer.

19. The recreational vehicle of claim 1, with means for permitting said camping occupant to enter said extension from more forward locations in said compartment.

20. The recreational vehicle of claim 1, wherein said beneficial use means comprises a longitudinally-oriented bed situated at least in part in said extension.

21. The recreational vehicle of claim 1, wherein said beneficial use means comprises at least two vertically separated longitudinally-oriented bunk beds which are situated at least in part in said extension.

22. The recreational vehicle of claim 1, wherein said beneficial use means comprises a recliner-type seat situated at least in part in said extension.

23. The recreational vehicle of claim 1, wherein said beneficial use means comprises a walk-in closet situated at least in part in said extension, which closet is usable by said camping occupant for storing and retrieving articles such as articles of clothing.

24. The recreational vehicle of claim 1, wherein said beneficial use means comprises means for cooking situated at least in part in said extension.

25. The recreational vehicle of claim 1, wherein said beneficial use means comprises means for dining situated at least in part in said extension.

26. The recreational vehicle of claim 1, wherein said beneficial use means comprises means for bathing suitable for use by said camping occupant for bathing, which means for bathing is situated at least in part in said extension.

27. The recreational vehicle of claim 1, wherein said beneficial use means comprises toilet means suitable for use by said camping occupant for at least one of urination or defecation, which toilet means is situated at least in part in said extension.

28. The recreational vehicle of claim 27, further comprising sink means for permitting hand-washing, which sink means is also situated at least in part in said extension.

29. The recreational vehicle of claim 1, wherein said beneficial use means comprise said extension being at least 17 inches wide and at least 70 inches tall so as to be able to accommodate a normal-sized camping occupant in a standing posture.

30. The recreational vehicle of claim 1, further comprising a second extension extending rearwardly substantially to a rear end of said body, which second extension is situated on the opposite side of said cargo bed as said extension.

31. The recreational vehicle of claim 1, wherein said roof includes at least one skylight.

32. The recreational vehicle of claim 1, wherein said roof includes at least one openable sunroof section.

33. The recreational vehicle of claim 1, wherein said cargo bed is of sufficient size and shape to enable carriage of more than one bicycle.

34. The recreational vehicle of claim 1, wherein said cargo bed is of sufficient size and shape to enable carriage of a motorcycle.

35. The recreational vehicle of claim 1, wherein said cargo bed is of sufficient size and shape to enable carriage of a boat such as a canoe.

36. The recreational vehicle of claim 1, wherein said cargo bed is of sufficient size and shape to enable carriage of a water-scooter.

37. The recreational vehicle of claim 1, wherein said cargo bed is of sufficient size and shape to enable carriage of a snowmobile.

38. The recreational vehicle of claim 1, wherein said cargo bed is of sufficient size and shape to enable carriage of an all-terrain-vehicle.

39. The recreational vehicle of claim 1, wherein said cargo bed is of sufficient size and shape to enable carriage of a narrow automobile.

40. The recreational vehicle of claim 1, wherein said cargo bed is at least 30 inches wide.

41. The recreational vehicle of claim 1, wherein said cargo bed is at least 60 inches long.

42. The recreational vehicle of claim 1, further comprising openable tailgate means at the aft end of said cargo bed, for enabling cargo loads to be loaded into and unloaded from said cargo bed.

43. The recreational vehicle of claim 1, further comprising deployable ramp means at the aft end of said cargo bed, for facilitating the loading and unloading of cargo into and from said cargo bed.

44. The recreational vehicle of claim 1, further comprising deployable cargo lift means at the aft end of said cargo bed, for facilitating the loading and unloading of cargo into and from said cargo bed.

45. The recreational vehicle of claim 1, further comprising cargo bed access door means for permitting said camping occupant to traverse from within said compartment to said cargo bed.

46. The recreational vehicle of claim 1, wherein said cargo bed is of sufficient size and shape to accommodate a mattress for permitting said camping occupant to sleep thereon.

47. The recreational vehicle of claim 1, wherein said cargo bed is of sufficient size and shape to accommodate a garden area with living plants.

48. The recreational vehicle of claim 1, wherein said cargo bed is of sufficient size and shape to accommodate a hot tub for use by said camping occupant.

49. The recreational vehicle of claim 1, further comprising nonpermanent means for covering the top of said cargo bed on an as-desired basis.

50. The recreational vehicle of claim 1, further comprising a deployable cargo bed extension for extending said cargo bed, which deployable cargo bed extension includes an extension surface which serves as a cargo bed extension floor when said deployable cargo bed extension is deployed, and which extension surface serves as a tailgate surface for said cargo bed when said deployable cargo bed extension is undeployed.

51. The recreational vehicle of claim 1, wherein said cargo bed is of sufficient size and shape to accommodate a game table for use by said camping occupant.

52. The recreational vehicle of claim 1, wherein said cargo bed is located at least in part above an aft engine compartment.

53. The recreational vehicle of claim 1, wherein said cargo bed is located at least in part above a fuel tank.

54. The recreational vehicle of claim 1, wherein said cargo bed is located at least in part above a spare tire housing.

55. The recreational vehicle of claim 50, wherein said cargo bed extension includes extension sidewalls.

56. The recreational vehicle of claim 50, further comprising a coverable window panel in said extension surface.

57. The recreational vehicle of claim 50, further comprising an openable access panel in said extension surface.

58. The recreational vehicle of claim 1, further comprising an active suspension system.

* * * * *